(12) United States Patent
Takahashi et al.

(10) Patent No.: US 8,994,842 B2
(45) Date of Patent: Mar. 31, 2015

(54) ZOOM LENS AND IMAGE PICKUP APPARATUS EQUIPPED WITH SAME

(71) Applicant: Olympus Imaging Corp., Tokyo (JP)

(72) Inventors: Toshio Takahashi, Tokyo (JP); Hiroshi Kodama, Tokyo (JP); Kento Hara, Tokyo (JP); Kazumi Ito, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 14/070,926

(22) Filed: Nov. 4, 2013

(65) Prior Publication Data

US 2014/0132790 A1  May 15, 2014

(30) Foreign Application Priority Data

Nov. 8, 2012 (JP) ................................. 2012-246584

(51) Int. Cl.
  *H04N 5/232* (2006.01)
  *G02B 15/14* (2006.01)
(52) U.S. Cl.
  CPC ............ *H04N 5/23245* (2013.01); *G02B 15/14* (2013.01)
  USPC ....................................... 348/220.1; 359/683
(58) Field of Classification Search
  CPC ..... H04N 5/23245; G02B 15/14; G02B 13/04
  USPC ................ 348/220.1; 359/683, 684, 686, 689
  See application file for complete search history.

(56) References Cited

U.S. PATENT DOCUMENTS

| | | | | |
|---|---|---|---|---|
| 8,525,894 B2 * | 9/2013 | Kunishige et al. | ......... | 348/220.1 |
| 8,587,683 B2 * | 11/2013 | Fujii | ......... | 348/220.1 |
| 8,605,162 B2 * | 12/2013 | Ejima et al. | ......... | 348/220.1 |
| 8,654,203 B2 * | 2/2014 | Kuriyama | ......... | 348/220.1 |
| 8,659,671 B2 * | 2/2014 | Kiyamura et al. | ......... | 348/220.1 |

FOREIGN PATENT DOCUMENTS

JP     2011-197058     10/2011

* cited by examiner

*Primary Examiner* — David N Spector
(74) *Attorney, Agent, or Firm* — Kenyon & Kenyon LLP

(57) ABSTRACT

A zoom lens includes a frontmost lens unit, which is located closest to the object side and a plurality of lens units located closer to the image side than the frontmost lens unit. All the distances between adjacent lens units vary during zooming in the state in which the zoom lens is focused on an object at infinity. One of the plurality of lens units is a first focusing lens unit. During focusing from an object at infinity to an object at a short distance in a first shooting mode, only the first focusing lens unit moves. During focusing from an object at infinity to an object at a short distance in a second shooting mode, two lens units in the zoom lens move.

21 Claims, 21 Drawing Sheets

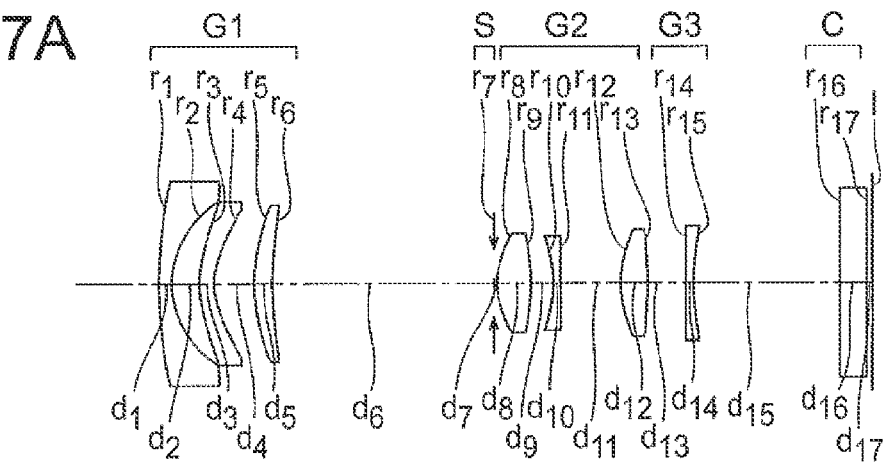
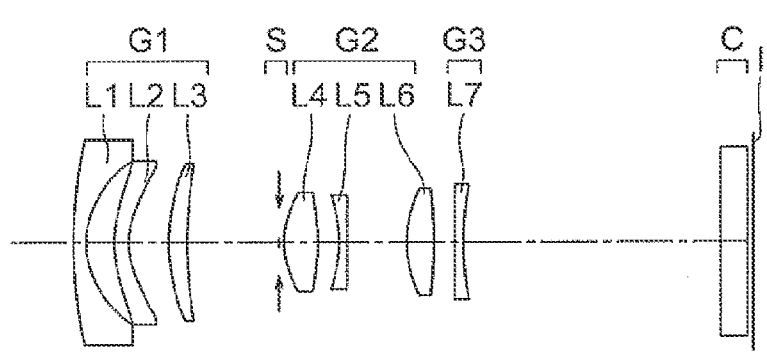
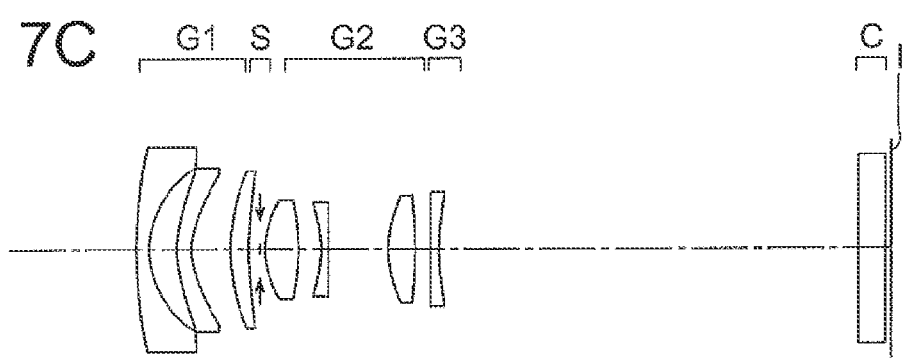

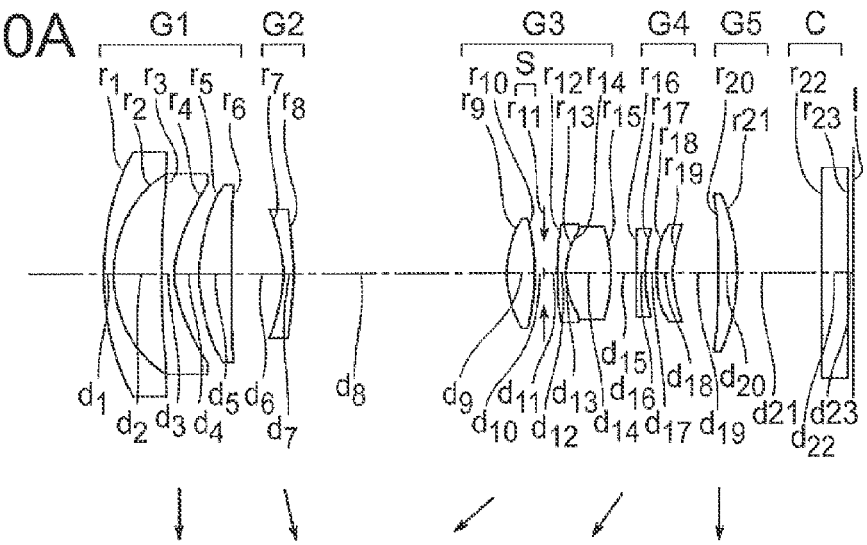
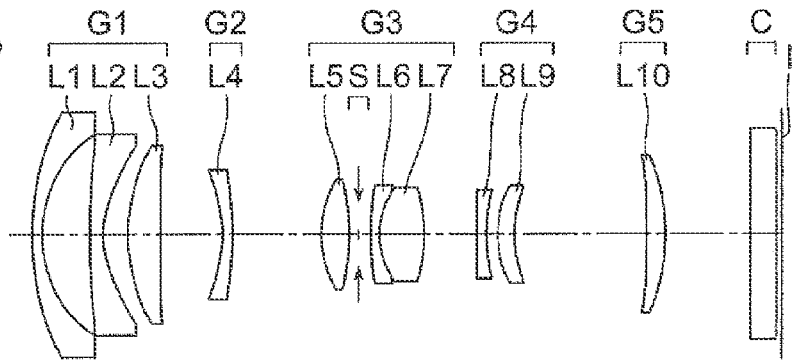
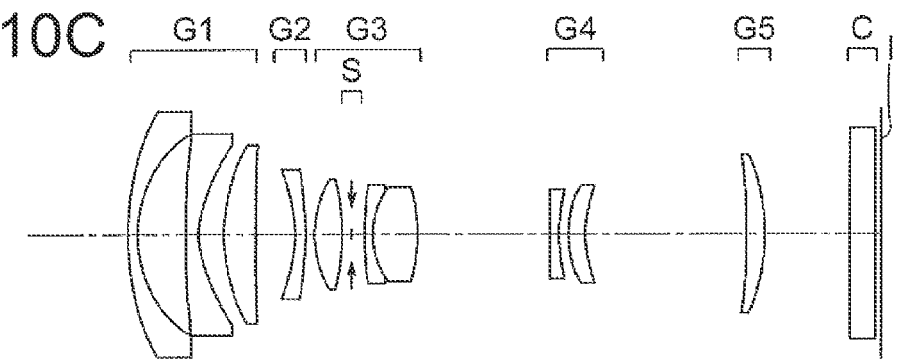

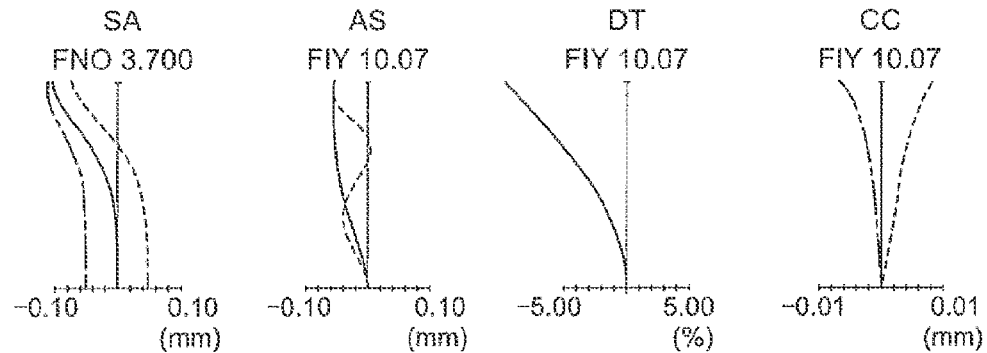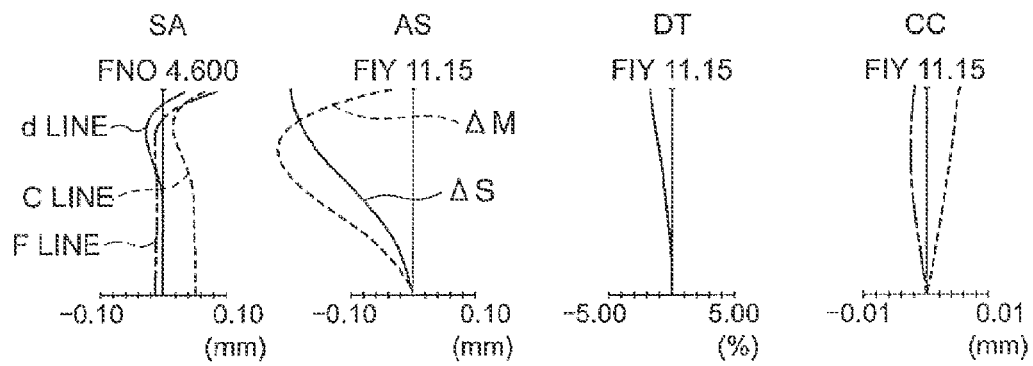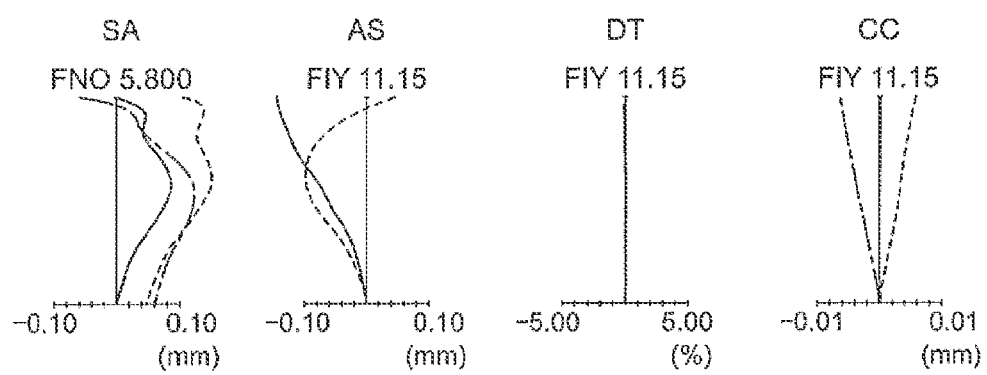

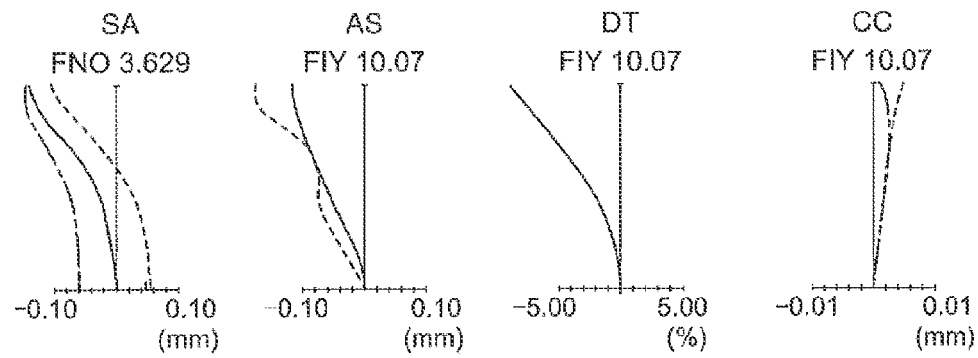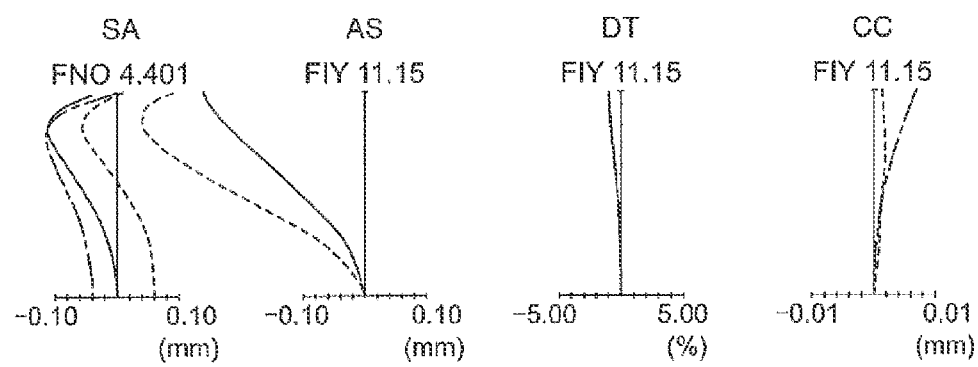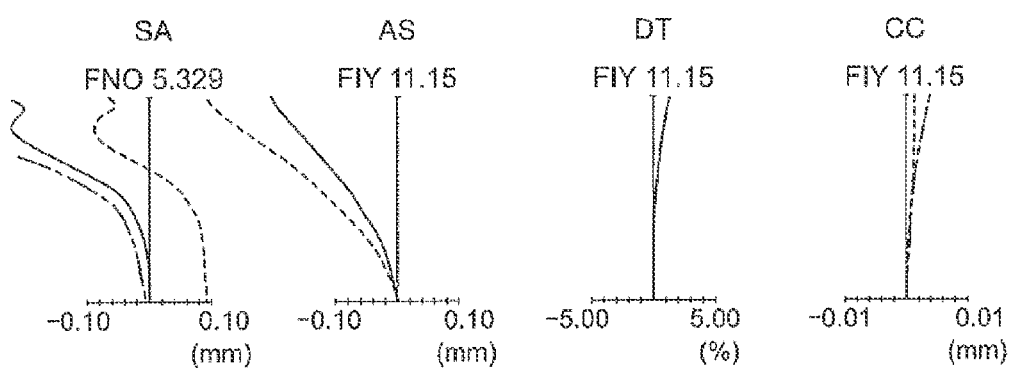

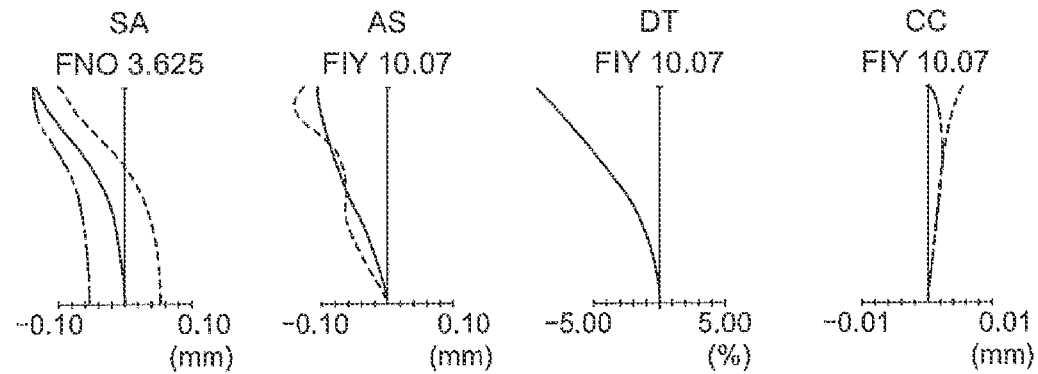
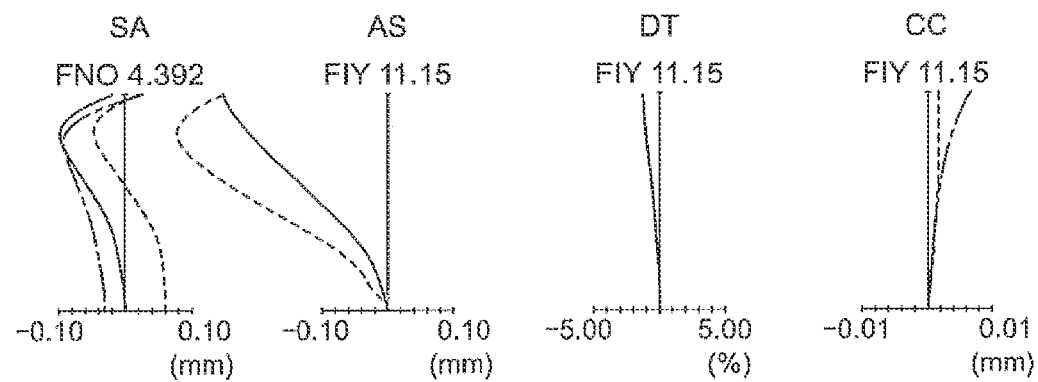
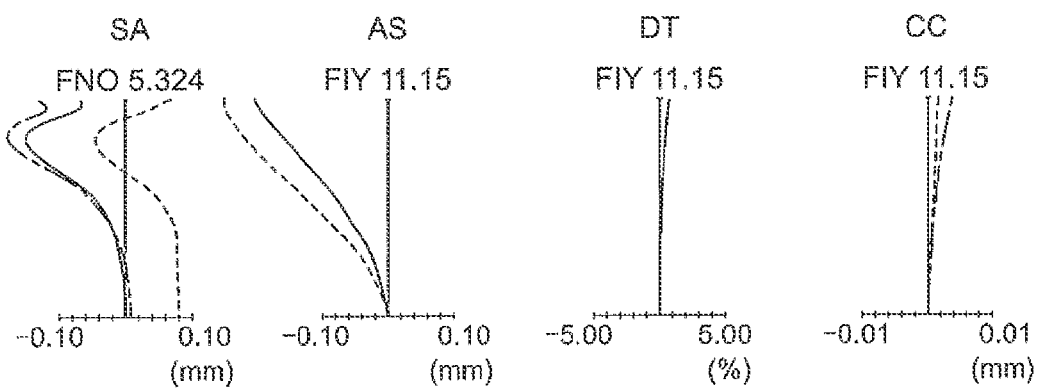

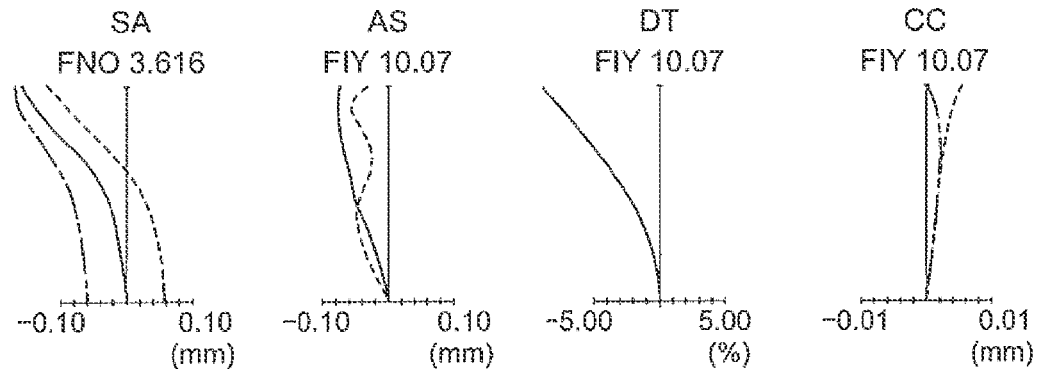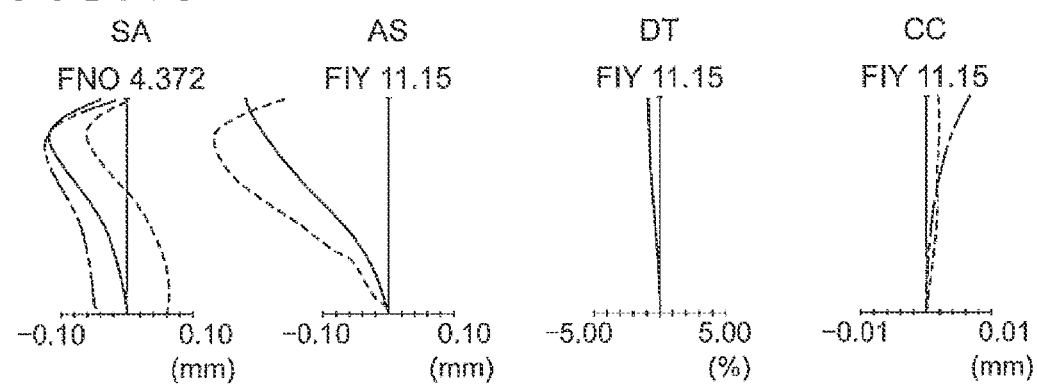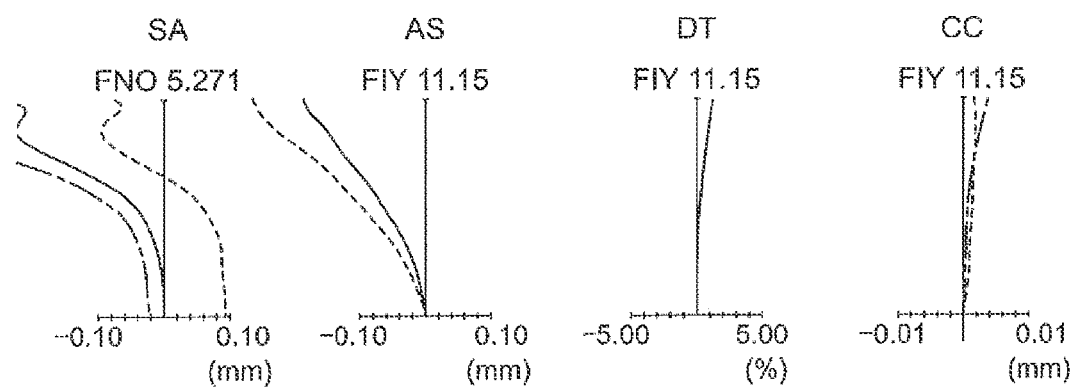

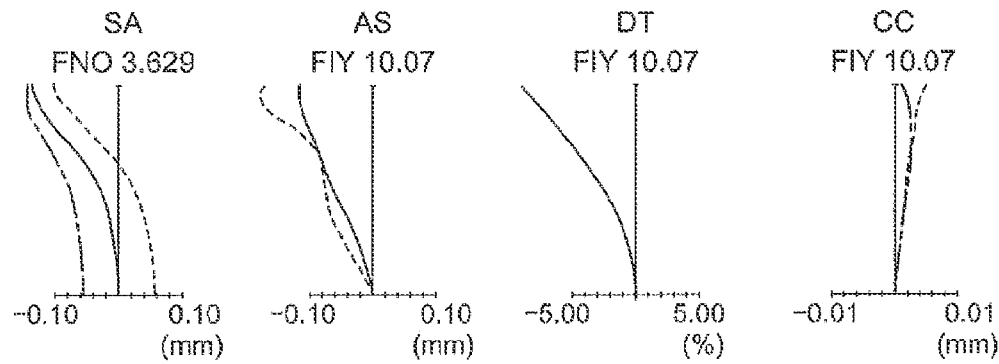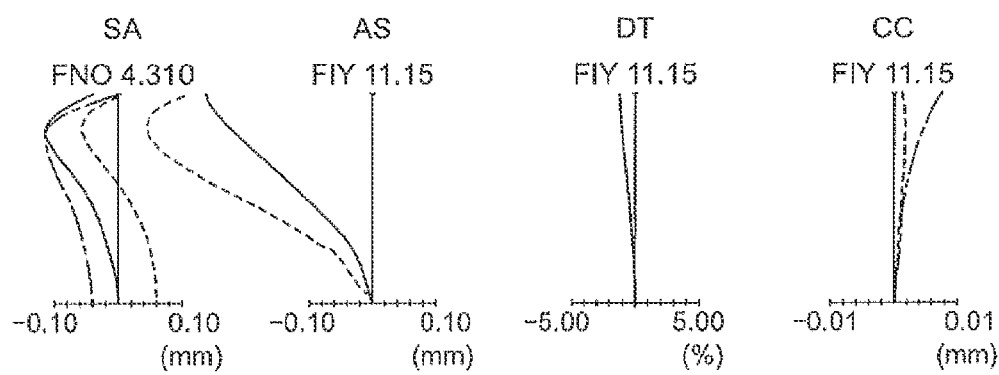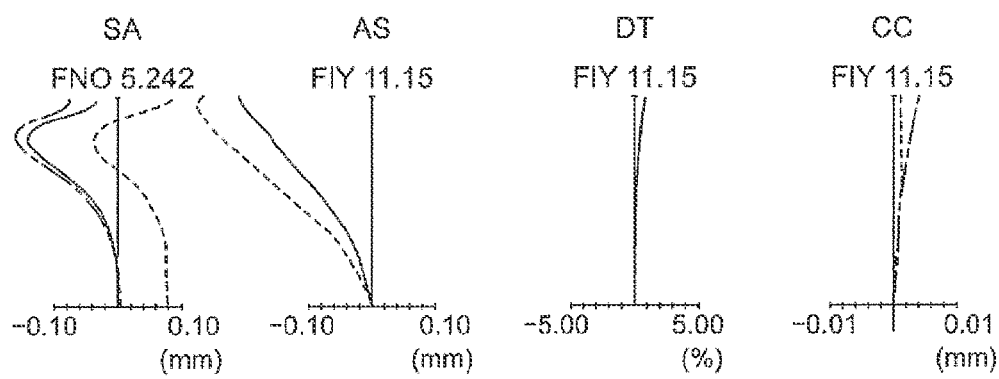

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2012-246584 filed on Nov. 8, 2012; the entire contents of which are incorporated herein by reference.

BACKGROUND OF THE INVENTION

1. Field of the Invention

The present invention relates to a zoom lens and an image pickup apparatus equipped with the same.

2. Description of the Related Art

Zoom lenses having variable angles of view and image pickup apparatuses equipped with such zoom lenses are known. In some zoom lenses, internal focusing is adopted. In internal focusing lenses, the lens unit located closest to the object side is stationary during focusing, and a lens unit(s) other than this lens unit is (are) moved for focusing.

Whatever the focusing scheme may be, moving a lens unit(s) generates noise such as sound of movement of the lens unit(s). In addition, a driving mechanism for moving the lens unit(s) also generates driving noise.

The noise generated with movement of the lens unit(s) can be made relatively small in the internal focusing lens. Therefore, the level of noise in the sound recorded with shooting (of moving images) can be made low. For this reason, internal focusing is adopted in many optical systems for video cameras. An example of the zoom lens using internal focusing is disclosed in Japanese Patent Application Laid-Open No. 2011-197058.

While typical video cameras of several years ago only have the function of video shooting, recent models typically have the function of still image shooting in addition to video shooting. Likewise, while typical digital still cameras of several years ago only have the function of still image shooting, recent models typically are capable of selectively shooting still images and videos.

SUMMARY OF THE INVENTION

A zoom lens according to the present invention comprises:
a frontmost lens unit, which is located closest to the object side; and
a plurality of lens units located closer to the image side than the frontmost lens unit, wherein
all the distances between adjacent lens units vary during zooming in the state in which the zoom lens is focused on an object at infinity,
one of the plurality of lens units is a first focusing lens unit,
during focusing from an object at infinity to an object at a short distance in a first shooting mode, only the first focusing lens unit moves, and
during focusing from an object at infinity to an object at a short distance in a second shooting mode, two lens units in the zoom lens move.

An image pickup apparatus according to the present invention comprises:
the above-described zoom lens;
an image pickup element that converts an image formed by the zoom lens into an electrical signal; and
an operation part used to switch between a first shooting mode and a second shooting mode, wherein when the first shooting mode is selected, the image pickup apparatus is configured to perform video shooting, and
when the second shooting mode is selected, the image pickup apparatus is configured to perform still image shooting.

BRIEF DESCRIPTION OF THE DRAWINGS

FIG. 1A shows the state at the wide angle end, FIG. 1B shows the state in an intermediate focal length state, and FIG. 1C shows the state at the telephoto end;

FIG. 4A shows the state at the wide angle end, FIG. 4B shows the state in an intermediate focal length state, and FIG. 4C shows the state at the telephoto end;

Figure 8A:
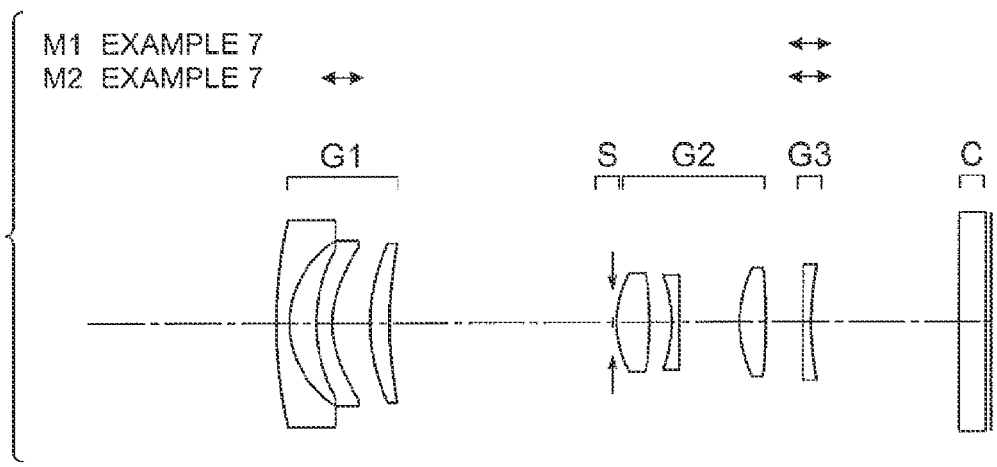
Figure 8B:
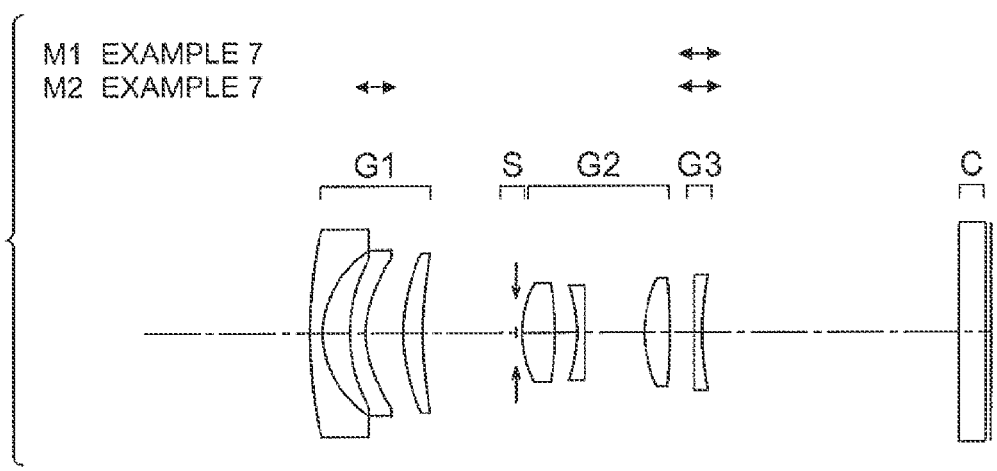
Figure 8C:
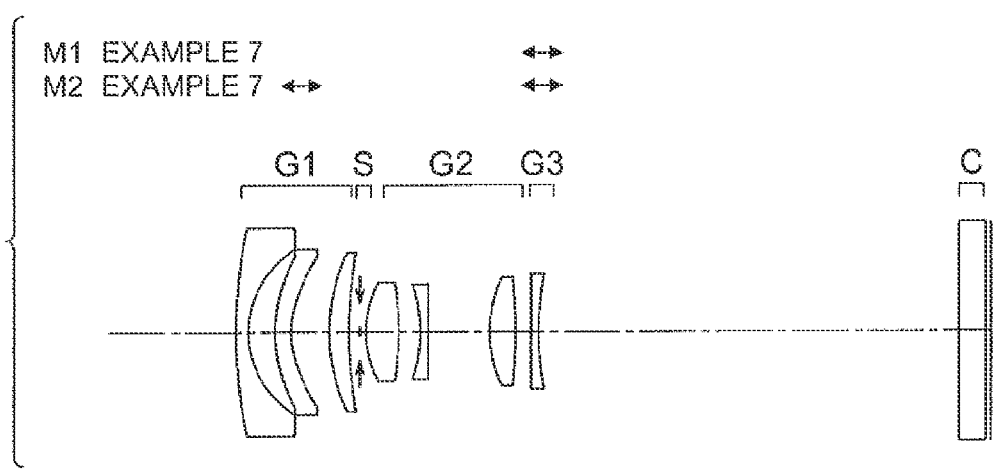
Figure 9:
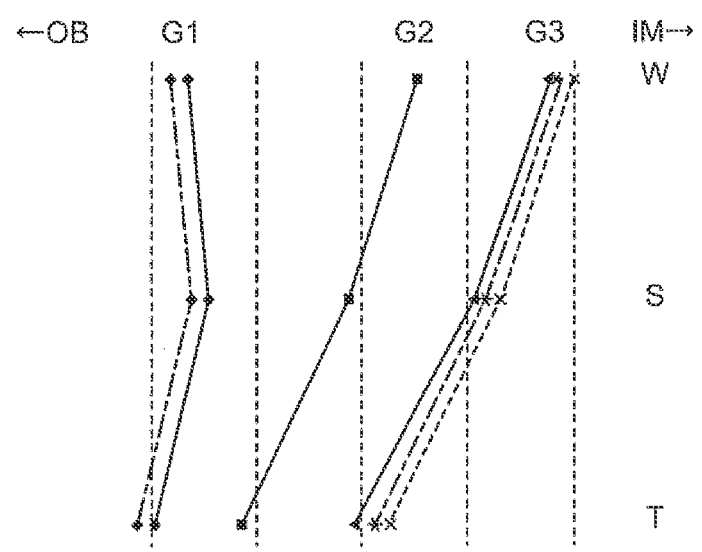
Figure 11A:
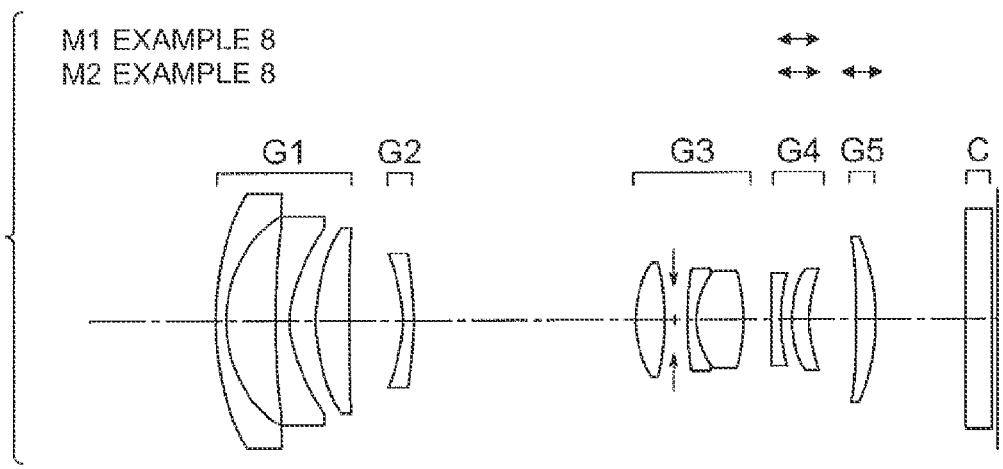
Figure 11B:
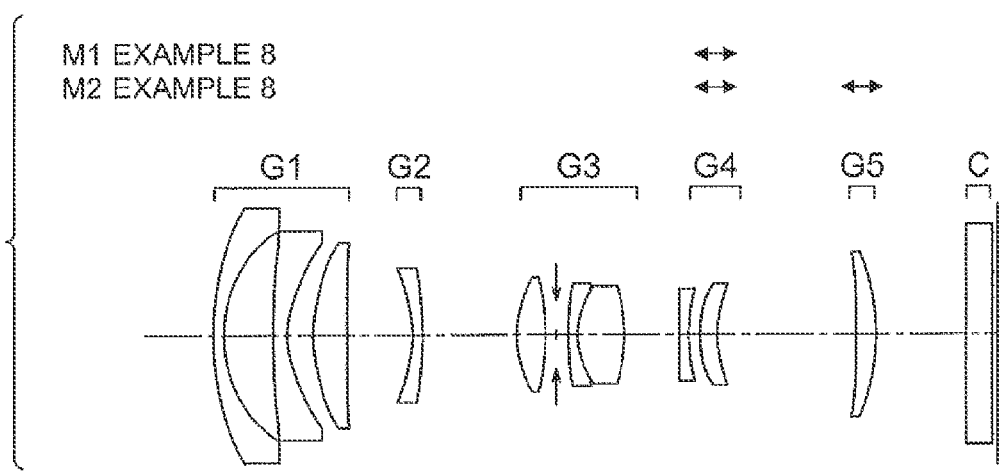
Figure 11C:
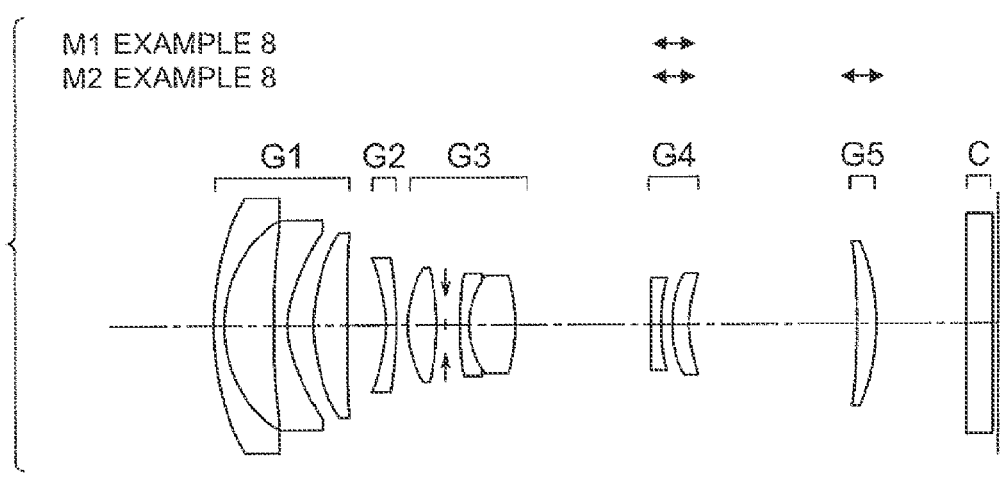
Figure 12:
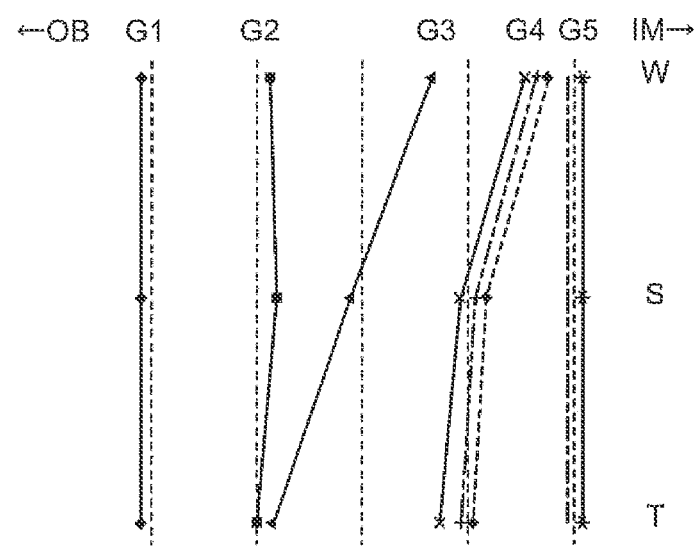
Figure 18:
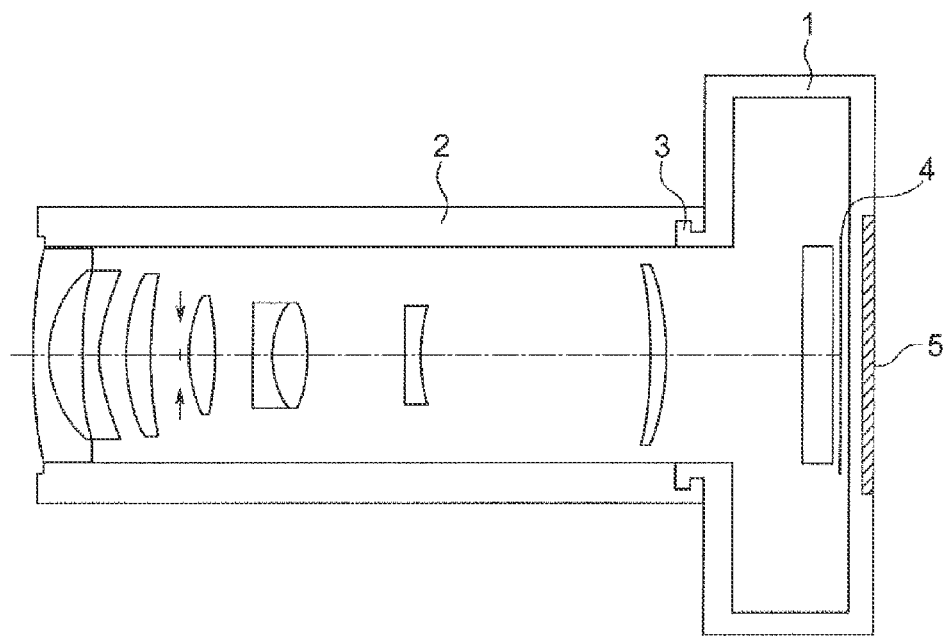
Figure 19:
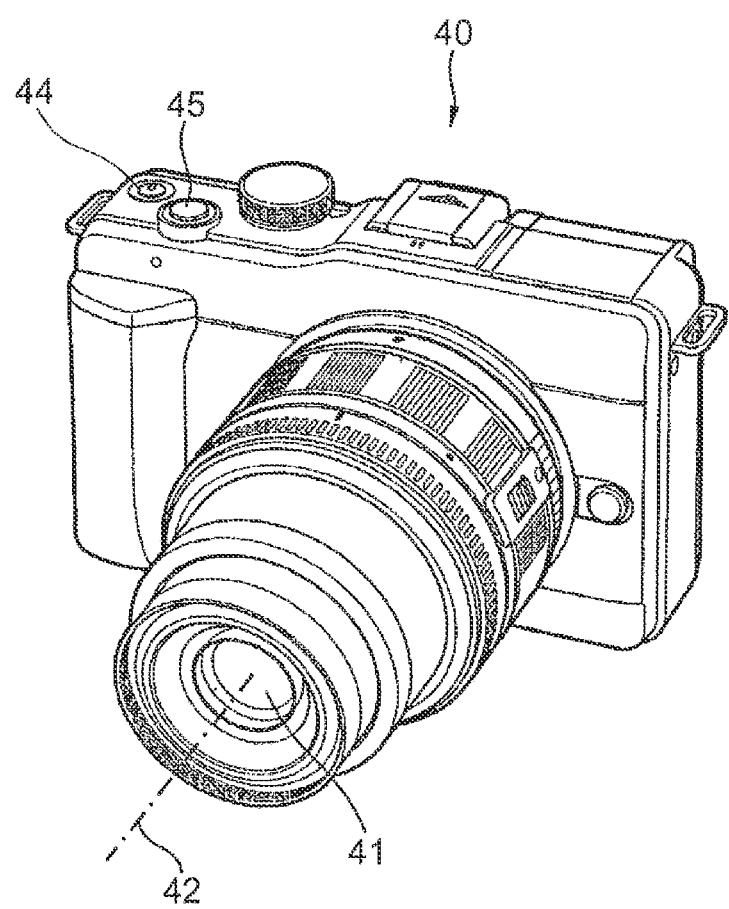
Figure 20:
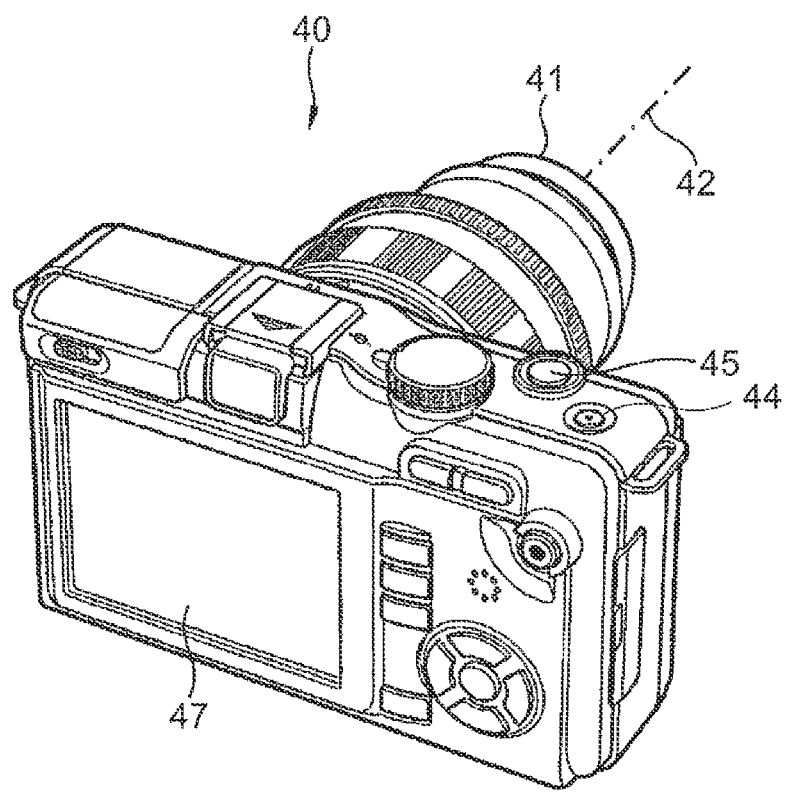

Figs;

FIGS. 7A, 7B, and 7C are cross sectional views of a zoom lens according to a seventh example of the present invention in the state in which the zoom lens is focused on an object point at infinity, where FIG. 7A shows the state at the wide angle end, FIG. 7B shows the state in an intermediate focal length state, and FIG. 7C shows the state at the telephoto end;

FIGS. 8A, 8B, and 8C are diagrams showing lens units that move during focusing in the zoom lens according to the seventh example of the present invention at the wide angle end (FIG. 8A), in the intermediate focal length state (FIG. 8B), and at the telephoto end (FIG. 8C);

FIG. 9 is a diagram showing the loci of movement of the lens units during focusing in the zoom lens according to the seventh example of the present invention;

FIGS. 10A, 10B, and 10C are cross sectional views of a zoom lens according to an eighth example of the present invention in the state in which the zoom lens is focused on an object point at infinity, where FIG. 10A shows the state at the wide angle end, FIG. 10B shows the state in an intermediate focal length state, and FIG. 10C shows the state at the telephoto end;

FIGS. 11A, 11B, and 11C are diagrams showing lens units that move during focusing in the zoom lens according to the eighth example of the present invention at the wide angle end (FIG. 11A), in the intermediate focal length state (FIG. 11B), and at the telephoto end (FIG. 11C);

FIG. 12 is a diagram showing the loci of movement of the lens units during focusing in the zoom lens according to the eighth example of the present invention;

FIGS. 13A, 13B, 13C, 13D, 13E, 13F, 13G, 13H, 13I, 13J, 13K, and 13L are aberration diagrams of the zoom lens according to the common example A in the state in which the zoom lens is focused on an object at infinity;

FIGS. 14A, 14B, 14C, 14D, 14E, 14F, 14G, 14H, 14I, 14J, 14K, and 14L are aberration diagrams of the zoom lens according to the common example A in the state in which the zoom lens is focused on an object at a close distance in a first shooting mode;

FIGS. 15A, 15B, 15C, 15D, 15E, 15F, 15G, 15H, 15I, 15J, 15K, and 15L are aberration diagrams of the zoom lens according to the first example in the state in which the zoom lens is focused on an object at a close distance in a second shooting mode;

FIGS. 16A, 16B, 16C, 16D, 16E, 16F, 16G, 16H, 16I, 16J, 16K, and 16L are aberration diagrams of the zoom lens according to the second example in the state in which the zoom lens is focused on an object at a close distance in the second shooting mode;

FIGS. 17A, 17B, 17C, 17D, 17E, 17F, 17G, 17H, 17I, 17J, 17K, and 17L are aberration diagrams of the zoom lens according to the third example in the state in which the zoom lens is focused on an object at a close distance in the second shooting mode;

FIG. 18 is a cross sectional view of a digital camera equipped with a zoom lens according to the present invention;

FIG. 19 is a front perspective view showing the outer appearance of the digital camera;

FIG. 20 is a rear perspective view of the digital camera; and

Figure 21:
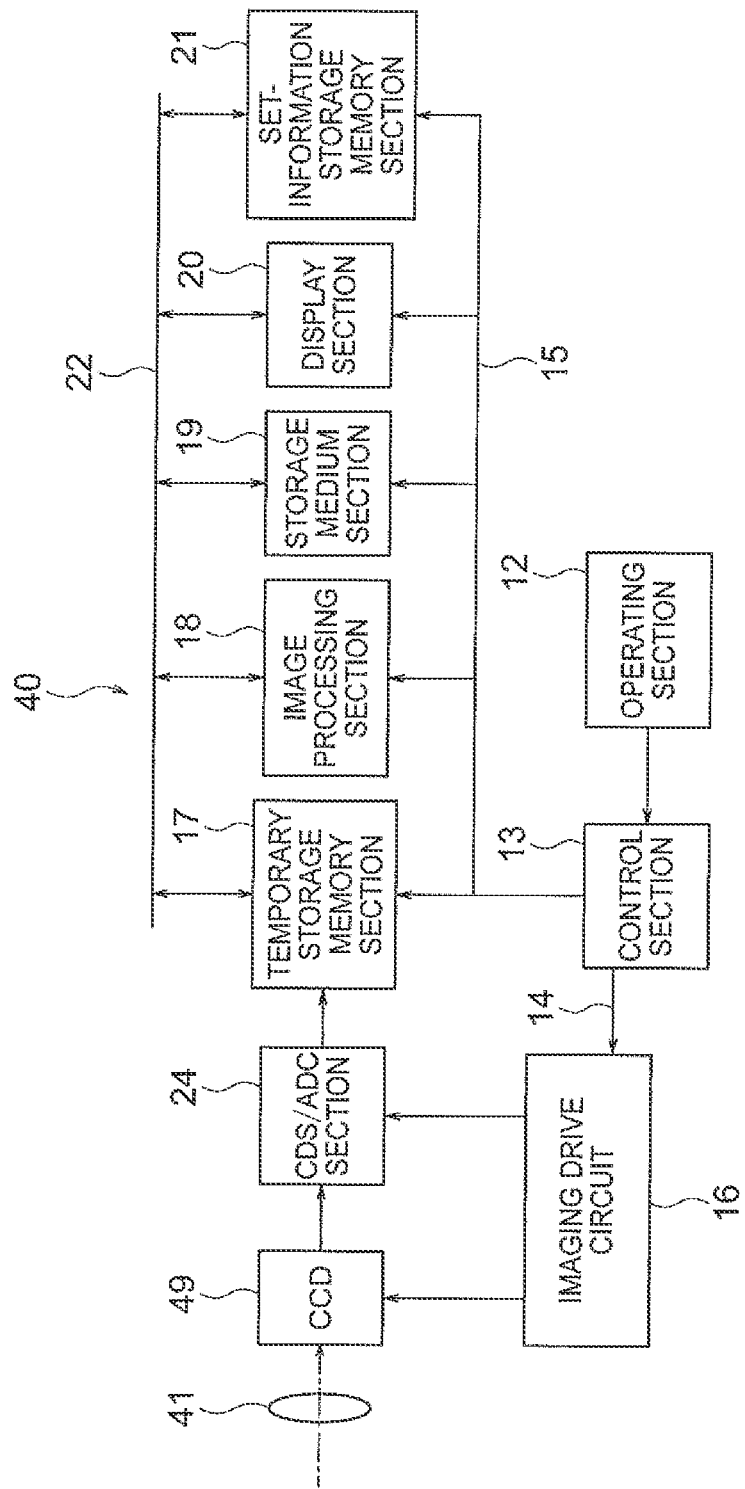

FIG. 21 is a block diagram showing the relevant internal circuit configuration of the digital camera.

DETAILED DESCRIPTION OF THE INVENTION

In the following, embodiments and examples of the zoom lens and the image pickup apparatus equipped with the same according to the present invention will be described in detail with reference to the drawings. It should be understood that the present invention is by no means limited by the embodiments and examples.

A zoom lens according to an embodiment includes a frontmost lens unit, which is the lens unit located closest to the object side, and a plurality of lens units located closer to the image side than the frontmost lens unit, wherein all the distances between adjacent lens units vary during zooming in the state in which the zoom lens is focused on an object at infinity, only a first focusing lens unit, which is one of the plurality of lens units, moves during focusing from an object at infinity to an object at a short distance in a first shooting mode, and two lens units in the zoom lens move during focusing from an object at infinity to an object at a short distance in a second shooting mode.

The zoom lens according to this embodiment includes the frontmost lens unit and the plurality of lens units located closer to the image side than the frontmost lens unit. One of the plurality of lens units is the first focusing lens unit. Moreover, two lens units among the lens units in the zoom lens also serve as focusing lens units. Therefore, focusing can be performed using the first focusing lens unit and the two lens units. Thus, different lens units may be moved for focusing in accordance with different shooting functions.

Specifically, during focusing from an object at infinity to an object at a short distance, only the first focusing lens unit is moved in the first shooting mode, and the two lens units in the zoom lens are moved in the second shooting mode.

In the first shooting mode, the lens unit moved for focusing is only the first focusing lens unit. Therefore, the lens unit moved for focusing (which will be hereinafter referred to as moving lens unit(s)) can be made light in weight. The lightweight moving lens unit is favorable for reduction of power consumption (driving power consumption) in focusing, reduction of moving sound and driving noise (which will be hereinafter referred to as noises), and reduction of the time taken for focusing. In the focusing operation, wobbling of a lens unit is performed in some cases. The light-weight moving lens unit is favorable for reduction of the power consumption (driving power consumption) in wobbling and reduction of noises. The "wobbling" refers to the operation of moving the focusing lens unit by a small amount along the optical axis.

On the other hand, in the second shooting mode, the two lens units in the zoom lens are moved. In the second shooting mode, since there are two moving lens units, variation in aberration with movement of the lens units can be made smaller than that in the first shooting mode. Thus, high optical performance of the optical system can be maintained in the second shooting mode.

In video shooting, ambient sound is recorded during shooting. In addition, focusing and wobbling are performed frequently during shooting. As described above, in the first shooting mode, the power consumption in focusing and wobbling can be reduced and noises generated during shooting and wobbling can be reduced. For this reason, the first shooting mode is suitably exemplified by the video shooting mode.

In still image shooting, optical performance and image quality higher than those in video shooting are required, but focusing or wobbling is rarely performed during shooting (at the moment of shooting). As described above, in the second shooting mode, the optical system can achieve high optical performance. For this reason, the second shooting mode is suitably exemplified by the still image shooting mode.

It is preferred in the zoom lens according to this embodiment that one of the two lens units be the first focusing lens unit.

When this is the case, the same lens unit is moved in the first and second shooting modes. In this case, the same system (components) for moving the lens can be used in common, allowing cost reduction. Moreover, control of the movement of the lens unit can be made easier.

In the zoom lens according to this embodiment, it is preferred that the following conditional expression (1) be satisfied:

$$0.1 < M_{F1M2}/M_{F1M1} < 0.999 \tag{1}$$

where $M_{F1M1} = |M_{F1M1i} - M_{F1M1c}|$, and $M_{F1M2} = |M_{F1M2i} - M_{F1M2c}|$, where $M_{F1M1i}$, $M_{F1M1c}$, $M_{F1M2i}$, and $M_{F1M2c}$ are the distances from the first focusing lens unit to the image plane in a predetermined focal length state respectively specified as follows: $M_{F1M1i}$ is the distance in the state in which the zoom lens is focused on an object at infinity in the first shooting mode; $M_{F1M1c}$ is the distance in the state in which the zoom lens is focused on an object at a close distance in the first shooting mode; $M_{F1M2i}$ is the distance in the state in which the zoom lens is focused on an object at infinity in the second shooting mode; and $M_{F1M2c}$ is the distance in the state in which the zoom lens is focused on an object at the close distance in the second shooting mode, the distance from the object at the close distance referred to in the definition of $M_{F1M1c}$ to the image plane and the distance from the object at the close distance referred to in the definition of $M_{F1M2c}$ to the image plane being the same, and the predetermined focal length state being a certain focal length state in the range from the wide angle end to the telephoto end.

The values $M_{F1M1}$ and $M_{F1M2}$ represent the amounts of movement of the first focusing lens unit during focusing, namely the amount of movement of the first lens unit with the change of the focus state from the state in which the zoom lens is focused on an object at infinity to the state in which the zoom lens is focused on the close object. The value $M_{F1M1}$ represents the amount of movement in the first shooting mode, and the value $M_{F1M2}$ represents the amount of movement in the second shooting mode. Here, the term "close object" refers to an object at a position closer to the zoom lens than the positions of short distance objects in the normal in-focus range.

The values $M_{F1M1}$ and $M_{F1M2}$ represent the amounts of movement in a predetermined focal length state, which is the same between $M_{F1M1}$ and $M_{F1M2}$. For example, if $M_{F1M1}$ is the amount of movement at the wide angle end, $M_{F1M2}$ is also the amount of movement at the wide angle end.

The distance from the close object (or the object at the close distance) to the image plane (i.e. the object to image distance IO) is the same in calculation of both $M_{F1M1}$ and $M_{F1M2}$. For example, if the value $M_{F1M1}$ is calculated in the state in which the distance to the close object from the image plane is 200 mm, the value of $M_{F1M2}$ is also calculated in the state in which the distance to the close object from the image plane is 200 mm. In this connection, the distance from the close object to the image plane may vary with changes in the focal length state. For example, the distance from the close object to the image plane may be 100 mm at the wide angle end of the focal length range, 110 mm in an intermediate focal length state, and 105 mm at the telephoto end of the focal length range.

Conditional expression (1) specifies a preferred range for the value of the ratio of the amounts of movement in the respective two shooting modes.

As described above, in the second shooting mode, two lens units, one of which is the first focusing lens unit, move during focusing. If the value of $M_{F1M2}/M_{F1M1}$ in conditional expression (1) does not fall below the lower limit, the amount of movement of the first focusing lens unit in the second shooting mode can be appropriately large (namely, not unduly small). Then, the amount of movement of the other lens unit among the two lens unit can be designed to be small, allowing reduction in the size of the optical system. Therefore, values of $M_{F1M2}/M_{F1M1}$ not falling below the lower limit of conditional expression (1) are favorable for reduction in the size of the optical system.

If the value of $M_{F1M2}/M_{F1M1}$ in conditional expression (1) does not exceed the upper limit, the amount of movement of the lens unit other than the first focusing lens unit among the two lens units can be appropriately large. Thus, the first focusing lens unit and the other lens unit can be moved during focusing in the second shooting mode, enabling improvement of the optical performance of the optical system. If the value of $M_{F1M2}/M_{F1M1}$ in conditional expression (1) does not exceed the upper limit improvement of the optical performance is facilitated.

It is preferred in the zoom lens according to this embodiment that the following conditional expression (1') be satisfied:

$$0.15 < M_{F1M2}/M_{F1M1} < 0.98 \qquad (1').$$

The technical meaning of conditional expression (1') is the same as that of conditional expression (1).

It is preferred in the zoom lens according to this embodiment that at least one of the following expressions (2) and (3) be satisfied:

$$SP_{M2}/SP_{M1} < 1 \qquad (2), \text{ and}$$

$$CM_{M2}/CM_{M1} < 1 \qquad (3)$$

where $SP_{M1}$ is the absolute value of the amount of spherical aberration in a predetermined focal length state and in the state in which the zoom lens is focused on an object at a close distance in the first shooting mode, $SP_{M2}$ is the absolute value of the amount of spherical aberration in the predetermined focal length state and in the state in which the zoom lens is focused on an object at the close distance in the second shooting mode, $CM_{M1}$ is the absolute value of the distance from a paraxial image plane to a meridional image plane in the predetermined focal length state and in the state in which the zoom lens is focused on an object at the close distance in the first shooting mode, and $CM_{M2}$ is the absolute value of the distance from a paraxial image plane to a meridional image plane in the predetermined focal length state and in the state in which the zoom lens is focused on an object at the close distance in the second shooting mode, where the amount of spherical aberration refers to the amount of spherical aberration at a ray position of 0.7 times the largest entrance pupil diameter, the distance from the paraxial image plane to the meridional image plane refers to the distance at a position of 0.7 times the largest image height, the distance from the close object at the close distance referred to in the definition of $SP_{M1}$ and $CM_{M1}$ to the image plane and the distance from the object at the close distance referred to in the definition of $SP_{M2}$ and $CM_{M2}$ to the image plane are the same, and the predetermined focal length state is a certain focal length state in the range from the wide angle end to the telephoto end.

Conditional expression (2) specifies a preferred range of the value for the ratio of the amounts of spherical aberration in the respective two shooting modes.

If the value of $SP_{M2}/SP_{M1}$ in conditional expression (2) does not exceed the upper limit, the amount of spherical aberration generated in the second shooting mode can be smaller than the amount of spherical aberration generated in the first shooting mode. Consequently, images having high image quality (high resolution) in their central regions can be obtained in the second shooting mode. The ray position of 0.7 times the largest entrance pupil diameter refers to a position at a distance of 0.7 from the center of the entrance pupil when the distance from the center of the entrance pupil to the outermost edge of the pupil is normalized to be 1 (unity).

Conditional expression (3) specifies a preferred range of the value for the ratio of the amounts of curvature of field in the respective two shooting modes.

If the value of $CM_{M2}/CM_{M1}$ in conditional expression (3) does not exceed the upper limit, the amount of curvature of field generated in the second shooting mode can be smaller than the amount of curvature of field generated in the first shooting mode. Consequently, images having high image quality (high resolution) in their peripheral regions can be obtained in the second shooting mode.

The predetermined focal length state referred to above is the same in the definitions of $SP_{M1}$ and $CM_{M1}$ and in the definitions of $SP_{M2}$ and $CM_{M2}$. For example, if $SP_{M1}$ and $CM_{M1}$ are the amounts at the wide angle end of the focal length range, $SP_{M2}$ and $CM_{M2}$ are also the amounts at the wide angle end.

The distance from the close object (or the object at the close distance) to the image plane (i.e. the object to image distance IO) is the same in calculation of $SP_{M1}$ and $CM_{M1}$ and in calculation of $SP_{M2}$ and $CM_{M2}$. For example, if the values of $SP_{M1}$ and $CM_{M1}$ are calculated in the state in which the distance to the close object from the image plane is 200 mm, the values of $SP_{M2}$ and $CM_{M2}$ are also calculated in the state in which the distance to the close object from the image plane is 200 mm. In this connection, the distance from the close object to the image plane may vary with changes in the focal length state. For example, the distance from the close object to the image plane may be 100 mm at the wide angle end of the focal length range, 110 mm in an intermediate focal length state, and 105 mm at the telephoto end of the focal length range.

In the zoom lens according to this embodiment, it is preferred that conditional expressions (2) and (3) be both satisfied.

If conditional expressions (2) and (3) are both satisfied, images having high quality (high resolution) over the entire area from the center to periphery can be obtained in the second shooting mode.

In the zoom lens according to this embodiment, it is preferred that at least one of the following conditional expressions (2') and (3') be satisfied:

$$SP_{M2}/SP_{M1}<0.86 \quad (2'), \text{ and}$$

$$CM_{M2}/CM_{M1}<0.92 \quad (3').$$

The technical meanings of conditional expressions (2') and (3') are the same as those of conditional expressions (2) and (3).

It is preferred in the zoom lens according to this embodiment that the predetermined focal length state be the telephoto end (i.e. longest focal length state).

In the case where there is only one focusing lens unit, variation of aberrations with focusing tends to occur at the telephoto end. Satisfying the above conditional expressions (2) and (3) leads to small variation of aberrations with focusing. In consequence, images having high quality (high resolution) over the entire area from the center to periphery can be obtained even at the telephoto end.

It is preferred in the zoom lens according to this embodiment that when the two lens units are moved in a predetermined focal length state to change the focus state from a state in which the zoom lens is focused on an object at infinity to a state in which the zoom lens is focused on an object at a close distance, the direction of change in spherical aberration caused by one of the two units be positive and the direction of change in spherical aberration caused by the other of the two lens units be negative so that the change in spherical aberration caused by the one lens unit is cancelled by the change in spherical aberration caused by the other lens unit.

This can lead to reduced spherical aberration of the entire optical system. Consequently, images having high image quality (high resolution) in their central regions can be obtained.

It is preferred that spherical aberration be cancelled at a ray position of 0.7 times the largest exit pupil diameter and/or at the telephoto end of the focal length range.

It is preferred in the zoom lens according to this embodiment that when the two lens units are moved in a predetermined focal length state to change the focus state from a state in which the zoom lens is focused on an object at infinity to a state in which the zoom lens is focused on an object at a close distance, the direction of change in curvature of field in the meridional image plane caused by one of the two lens units be positive and the direction of change in curvature of field in the meridional plane caused by the other of the two lens units be negative so that the change in curvature of field in the meridional image plane caused by the one lens unit is cancelled by the change in curvature of field in the meridional image plane caused by the other lens unit.

This can lead to reduced curvature of field of the entire optical system. Consequently, images having high image quality (high resolution) in their peripheral regions can be obtained.

It is preferred that curvature of field be cancelled at a ray position of 0.7 times the largest exit pupil diameter and/or at the telephoto end of the focal length range.

It is preferred in the zoom lens according to this embodiment that the number of lenses in the first focusing lens unit be one or two.

As described above, the lens units are moved by a driving system during focusing and wobbling. If the number of lenses in the first focusing lens unit is one or two, the weight of the moving lens units can be small. This can lead to reduced load (mechanical load and power consumption) on the driving system during driving and reduced noises. It is more preferred that the number of lenses in the first focusing lens unit be one.

It is preferred in the zoom lens according to this embodiment that the aforementioned two lens units be the first focusing lens unit and the frontmost lens unit.

If this is the case, because there are two moving lens units, variation of aberrations with movement of the lens units during focusing can be smaller than in the case of the first shooting mode. Consequently, high optical performance of the optical system can be maintained in the second shooting mode. Moreover, moving the frontmost lens unit allows further improvement of the optical performance of the optical system.

It is preferred in the zoom lens according to this embodiment that the aforementioned two lens units be included in the plurality of lens units, and one of the aforementioned two lens units be the first focusing lens unit.

If this is the case, the focusing scheme of the zoom lens is internal focusing, which allows reduction of the overall length of the optical system. Moreover, because the frontmost lens unit is stationary during focusing and wobbling, leakage of noises to the outside can be reduced. Furthermore, the entrance of dust into the optical system can also be reduced.

It is preferred in the zoom lens according to this embodiment that the frontmost lens unit be a lens unit having a negative refractive power.

If the frontmost lens unit has a negative refractive power, the optical system can be constituted by a small number of lenses. Consequently, the overall length of the optical system can be made short. Moreover, the zoom lens can have a wide angle of view at the wide angle end with a small lens diameter. For these reasons, the frontmost lens unit having a negative refractive power is favorable for reduction of the size of the optical system and enlargement of the angle of view.

It is preferred in the zoom lens according to this embodiment that the total number of the lenses that move during focusing be two or less in the first shooting mode and four or more in the second shooting mode.

If the total number of the lenses that move during focusing is two or less in the first shooting mode, the weight of the moving lens unit can be small. In consequence, noises can be reduced and the load (mechanical load and power consumption) on the driving system during driving can be reduced in the first shooting mode.

If the total number of the lenses that move during focusing is four or more, variation of aberrations with movement of the lens units can be made small. Therefore, high optical performance of the optical system can be maintained in the second shooting mode.

It is preferred in the zoom lens according to this embodiment that only the first focusing lens unit move during focusing at the wide angle end in the first and second shooting modes, and the two lens units move during focusing at the telephoto end in the second shooting mode.

As only the first focusing lens unit is moved during focusing at the wide angle end, control information needed in moving the lens unit during focusing can be small. This makes control of movement of the lens unit easier.

In the second shooting mode, there are two lens units that move during focusing at the telephoto end. Therefore, in the second shooting mode, variation of aberrations with movement of the lens units can be made smaller at the telephoto end. Therefore, in the second shooting mode, high optical performance of the optical system can be maintained at the telephoto end.

It is preferred in the zoom lens according to this embodiment that the aforementioned two lens units include the first focusing lens unit and another lens unit, and the another lens unit move during focusing before the first focusing lens unit starts to move.

As two lens units are moved during focusing, one of the two lens units can be used for rough adjustment and the other lens unit can be used for fine adjustment. In this case, it is preferred that the lens unit other than the first focusing lens unit be used for rough adjustment, and the first focusing lens unit be used for fine adjustment. If the number of lenses in the first focusing lens unit is small, it is possible to move the first focusing lens unit at high speed and to position (or stop) it with high precision. Therefore, quick and highly precise focusing can be achieved in both the first and second shooting modes.

It is preferred that the zoom lens according to this embodiment be a four-unit zoom lens including, in order from the object side to the image side, a first lens unit having a negative refractive power, a second lens unit having a positive refractive power, a third lens unit having a negative refractive power, and a fourth lens unit having a positive refractive power, that the first focusing lens unit be the third lens unit, and that the aforementioned two lens units be the third lens unit and one of the first, second, and fourth lens units.

Although this zoom lens is a four-unit zoom lens that is small in size, it enables video shooting with low sound noises generated with movement of lens units and still image shooting with high image quality thanks to high optical performance.

It is preferred that the zoom lens according to this embodiment be a five-unit zoom lens including, in order from the object side to the image side, a first lens unit having a negative refractive power, a second lens unit having a negative refractive power, a third lens unit having a positive refractive power, a fourth lens unit having a negative refractive power, and a fifth lens unit having a positive refractive power, that the first focusing lens unit be the second lens unit, and that the aforementioned two lens units be the second lens unit and one of the first, fourth, and fifth lens units.

Although this zoom lens is a five-unit zoom lens that is small in size and has a wide angle of view, it enables video shooting with low sound noises generated with movement of lens units and still image shooting with high image quality thanks to high optical performance.

It is preferred that the zoom lens according to this embodiment be a three-unit zoom lens including, in order from the object side to the image side, a first lens unit having a negative refractive power, a second lens unit having a positive refractive power, and a third lens unit having a negative refractive power, that the first focusing lens unit be the third lens unit, and that the aforementioned two lens units be the first lens unit and the third lens unit.

Although this zoom lens is a three-unit zoom lens that is small in size, it enables video shooting with low sound noises generated with movement of lens units and still image shooting with high image quality thanks to high optical performance.

An image pickup apparatus according to an embodiment includes the above-described zoom lens, an image pickup element that converts an image formed by the zoom lens into an electrical signal, and an operation part used to switch between a first shooting mode and a second shooting mode, wherein when the first shooting mode is selected, the image pickup apparatus performs video shooting, and when the second shooting mode is selected, the image pickup apparatus performs still image shooting.

In the image pickup apparatus according to this embodiment, the number of the lens units that move during focusing is different between the first shooting mode and the second shooting mode. Therefore, the image pickup apparatus can shoot videos with low sound noises generated with movement of lens units and still images with high image quality thanks to high optical performance.

The features described in the foregoing may be adopted in combination individually. Conditional expressions may be adopted individually.

It is preferred that the upper and/or lower limit values in the conditional expressions presented in the foregoing be further limited as follows in order that the advantages can be enjoyed more surely.

In conditional expression (1), it is more preferred that the lower limit value be 0.15, and the upper limit value be 0.98.

In conditional expression (2), it is more preferred that the upper limit value be 0.81.

In conditional expression (3), it is more preferred that the upper limit value be 0.88.

In the zoom lens and the image pickup apparatus described in the foregoing, two or more features may be adopted in combination. This is preferable in achieving an image pickup apparatus having excellent optical performance. Combinations of preferable features may be selected as desired. Referring to above-described further limitations of the conditional expressions, the limitation may be applied to only one of the lower and upper limits in each conditional expression.

In the following, examples of the zoom lens according to the present invention will be described in detail with reference to the drawings. It should be understood that the present invention is by no means limited by the following examples.

Figure 1A:
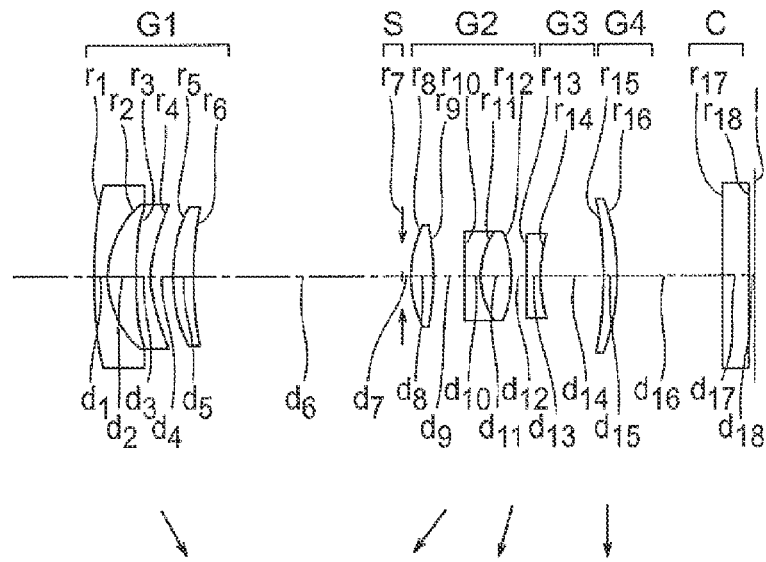
FIGS. 1A, 1B, and 1C are cross sectional views of a zoom lens according to a common example A of the present invention in the state in which the zoom lens is focused on an object point at infinity, where
Figure 1B:
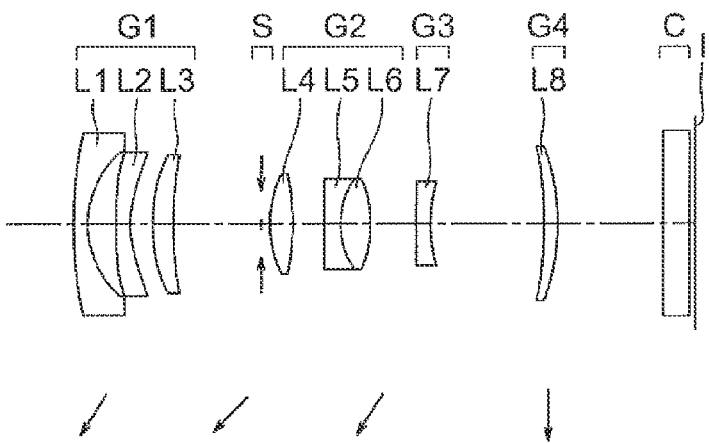
Figure 1C:
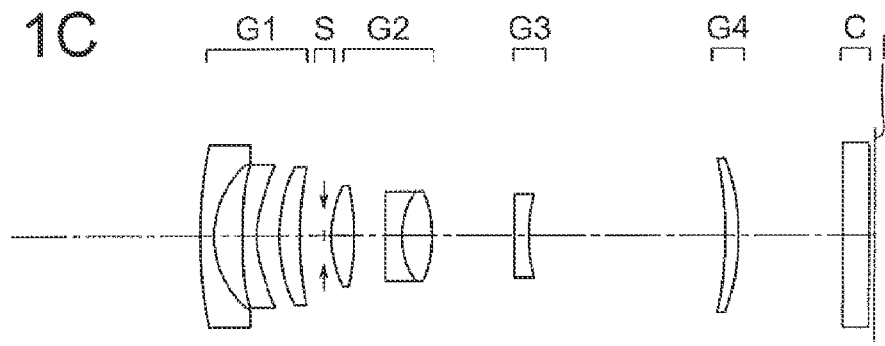
Figure 4A:
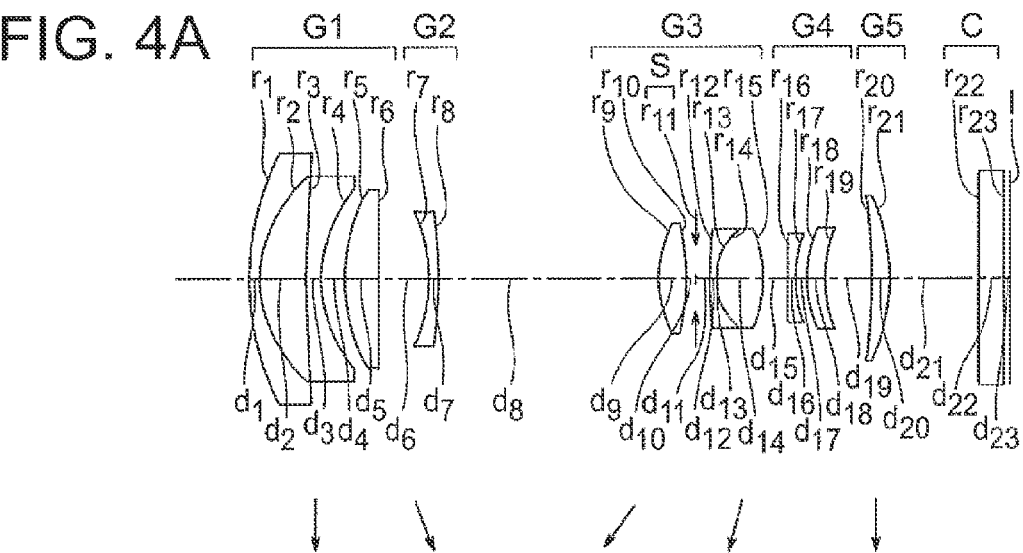
FIGS. 4A, 4B, and 4C are cross sectional views of a zoom lens according to a common example B of the present invention in the state in which the zoom lens is focused on an object point at infinity, where
Figure 4B:
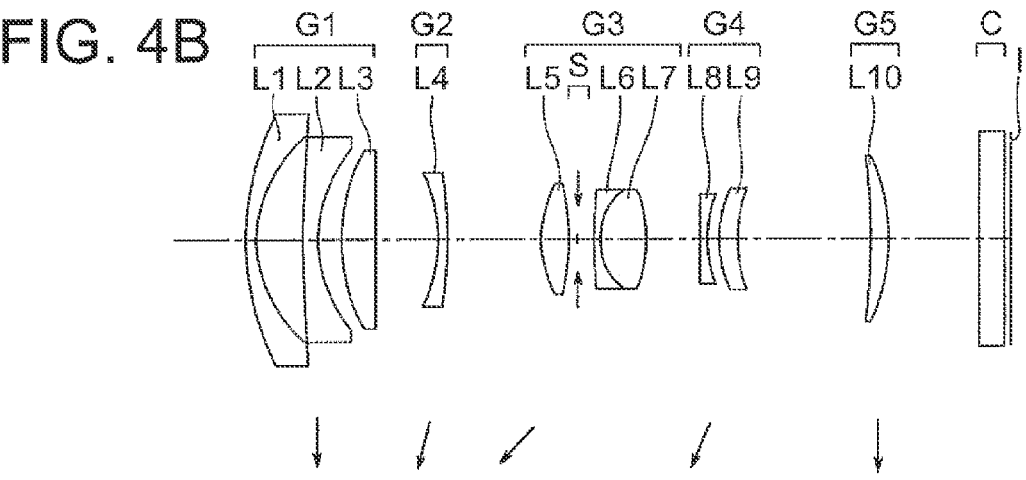
Figure 4C:
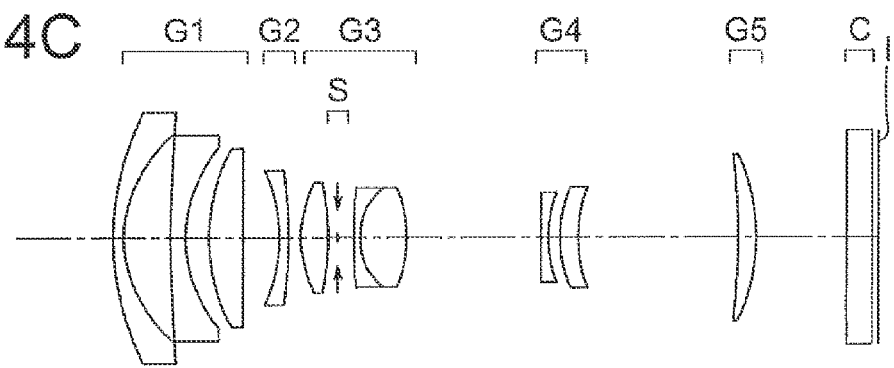

In the following, first to eighth examples of the zoom lens will be described. FIGS. 1A, 1B, and 1C (hereinafter, 'FIGS. 1A to 1C'), FIGS. 4A, 4B, and 4C (hereinafter, 'FIGS. 4A to 4C'), FIGS. 7A, 7B, and 7C (hereinafter 'FIGS. 7A to 7C'), and FIGS. 10A, 10B, and 10C (hereinafter, 'FIGS. 10A to 10C) are cross sectional views used to illustrating first to eighth examples. FIGS. 1A to 1C are cross sectional views of a zoom lens according to a common example A. Cross sectional views of the zoom lenses according to the first to third examples are the same as the cross sectional views in FIGS. 1A to 1C (common example A), and they are not shown individually. FIGS. 4A to 4C are cross sectional views of a zoom lens according to a common example B. Cross sectional views of the zoom lenses according to the fourth to sixth examples are the same as the cross sectional views in FIGS. 4A to 4C (common example B), and they are not shown individually. FIGS. 7A to 7C are cross sectional views of the zoom lens according to the seventh example. FIGS. 10A to 10C are cross sectional views of the zoom lens according to the eighth example.

Figure 2A:
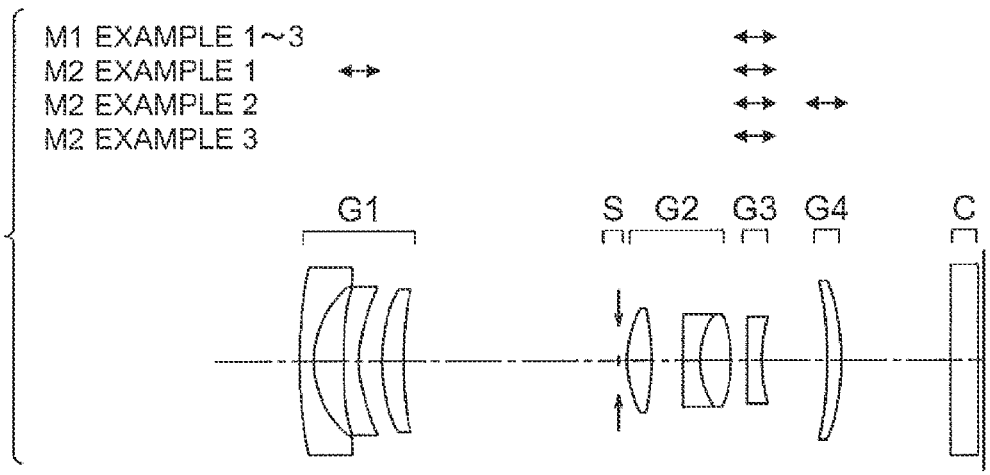
FIGS. 2A, 2B, and 2C are diagrams showing lens units that move during focusing in zoom lenses according to first to third examples of the present invention at the wide angle end (FIG. 2A), in the intermediate focal length state (FIG. 2B), and at the telephoto end (FIG. 2C)
Figure 2B:
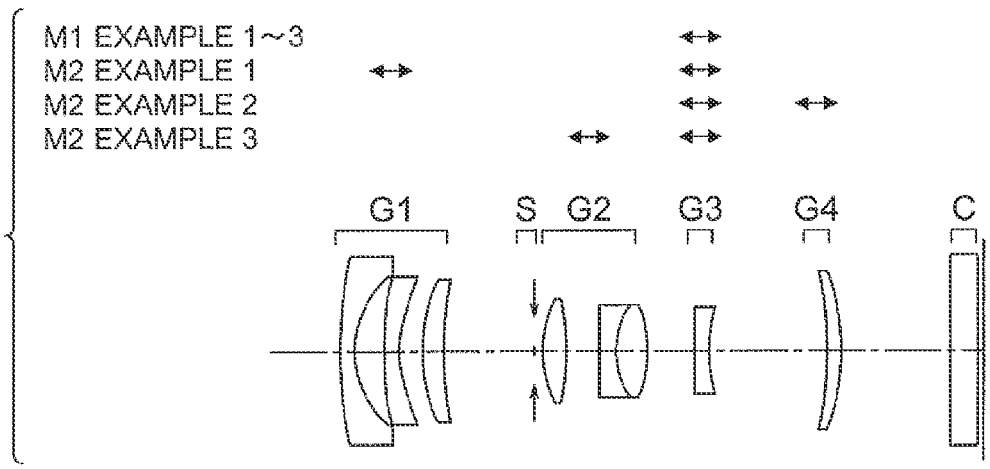
Figure 2C:
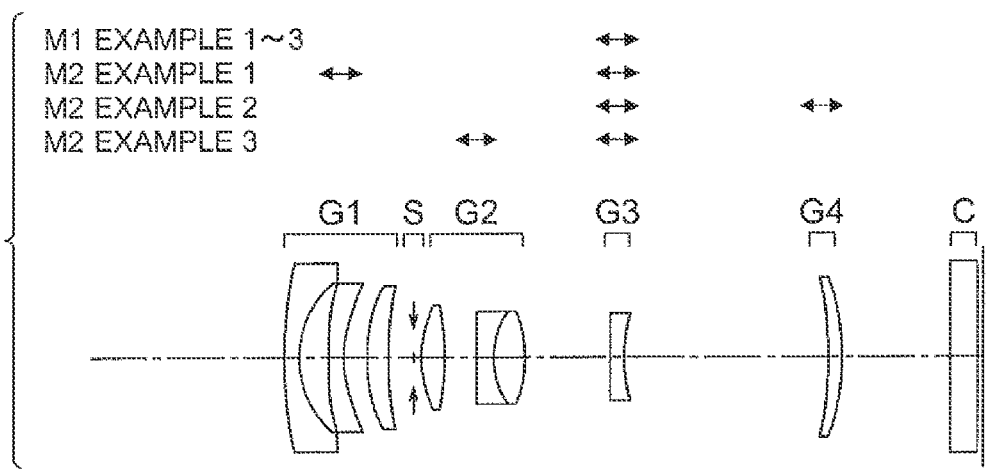

FIGS. 2A, 2B, and 2C (hereinafter, 'FIGS. 2A to 2C'), FIGS. 5A, 5B, and 5C (hereinafter, 'FIGS. 5A to 5C'), FIGS. 8A, 8B, and 8C (hereinafter, 'FIGS. 8A to 8C'), and FIGS. 11A, 11B, and 11C (hereinafter, 'FIGS. 11A to 11C') are diagrams illustrating the lens units that move during focusing. FIGS. 2A to 2C, FIGS. 5A to 5C, FIGS. 8A to 8C, and FIGS. 11A to 11C are basically the same as FIGS. 1A to 1C, FIGS. 4A to 4C, FIGS. 7A to 7C, and FIGS. 10A to 10C respectively but augmented to include double-sided arrows. The lens units above which the double sided arrows are illustrated move during focusing.

Among these drawings, FIGS. 1A, 2A, 4A, 5A, 7A, 8A, 10A, and 11A are cross sectional views of the zoom lenses at the wide angle end, FIGS. 1B, 2B, 4B, 5B, 7B, 8B, 10B, and 11B are cross sectional views of the zoom lenses in an intermediate focal length state, and FIGS. 1C, 2C, 4C, 5C, 7C, 8C, 10C, and 11C are cross sectional views of the zoom lenses at the telephoto end. These drawings are cross sectional views of the zoom lenses in the state in which they are focused on an object at infinity.

Figure 3A:
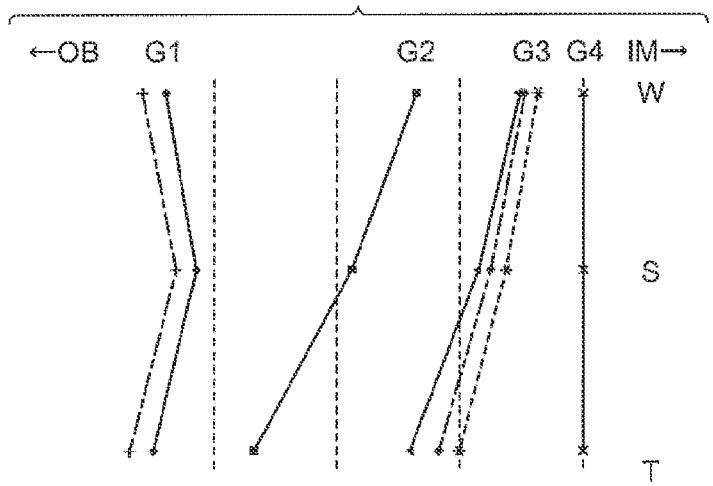
FIGS. 3A, 3B, and 3C are diagrams showing the loci of movement of the lens units during focusing in the zoom lenses according to the first to third examples of the present invention respectively.
Figure 3B:
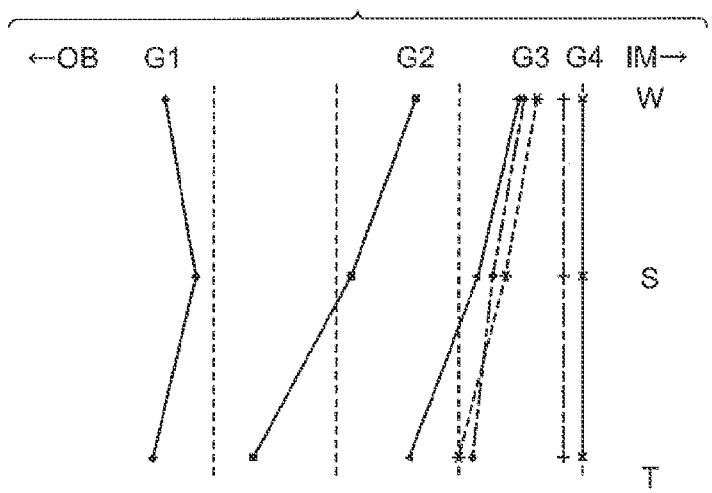
Figure 3C:
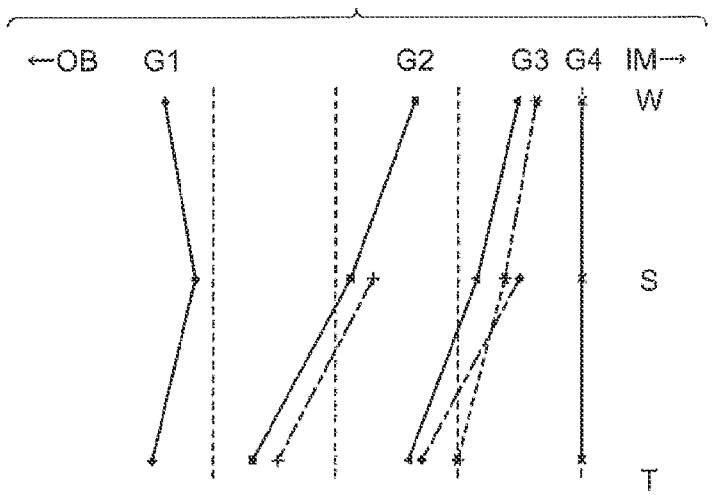
Figure 6A:
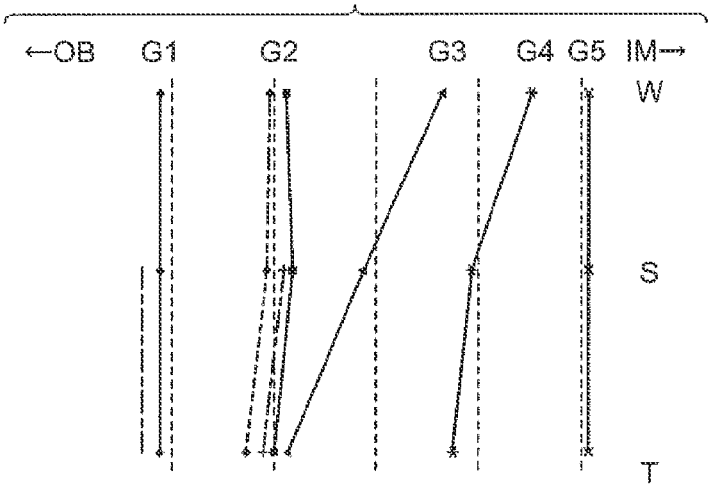
FIGS. 6A, 6B, and 6C are diagrams showing the loci of movement of the lens units during focusing in the zoom lenses according to the fourth to sixth examples of the present invention respectively.
Figure 6B:
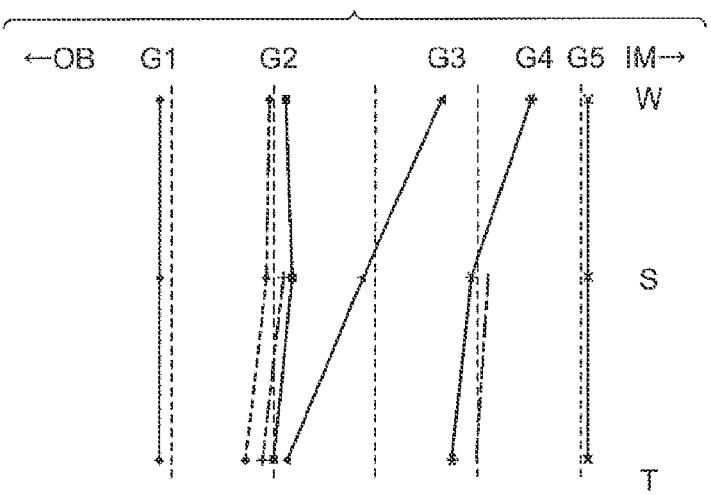
Figure 6C:
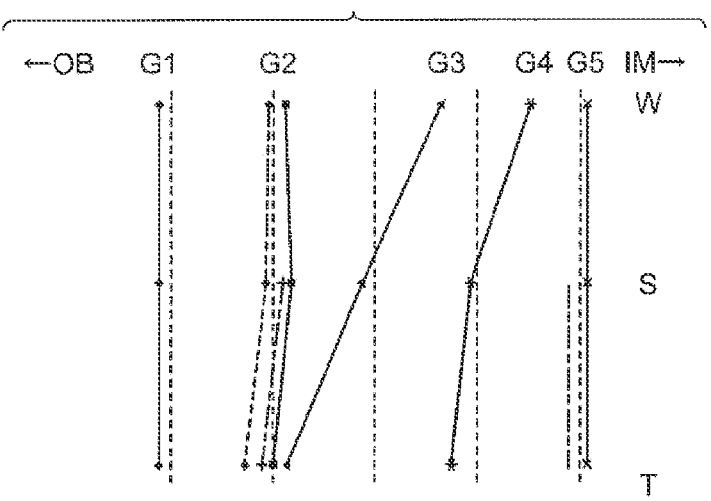

FIGS. 3A, 3B, and 3C (hereinafter, 'FIGS. 3A to 3C'), FIGS. 6A, 6B, and 6C (hereinafter, 'FIGS. 6A to 6C'), FIG. 9 and FIG. 12 are diagrams schematically showing the positions and loci of movement of the lens units during focusing for the respective examples. FIG. 3A shows the loci of movement of the lens units in the first example. FIG. 3B shows the loci of movement of the lens units in the second example. FIG. 3C shows the loci of movement of the lens units in the third example. FIG. 6A shows the loci of movement of the lens units in the fourth example. FIG. 6B shows the loci of movement of the lens units in the fifth example. FIG. 6C shows the loci of movement of the lens units in the sixth example. In these diagrams, the loci of movement of the lens units are drawn in exaggerated manners to facilitate understanding. Numerical values specifying the amounts of movement of the lens units will be presented later in numerical data of the examples. The loci of movement of the lens units shown in the diagrams do not reflect exactly the amounts of movement expressed by the numerical values.

In these diagrams, the solid lines represent the positions of the respective lens units in the state in which the zoom lens is focused on an object at infinity and their loci of movement with zooming. The broken lines represent the positions and loci of movement of the lens units that move during focusing in the first shooting mode. The chain lines represent the positions and loci of movement of the lens units that move during focusing in the second shooting mode. The chain double dashed lines represent the positions and loci of movement of the lens units that move during focusing in both the first and the second shooting modes.

In the drawings, a first lens unit is denoted by G1, a second lens unit is denoted by G2, an aperture stop is denoted by S, a third lens unit is denoted by G3, a fourth lens unit is denoted by G4, a fifth lens unit is denoted by G5, a plane parallel plate constituting a cover glass for an electronic image pickup element is denoted by C, and the image plane is denoted by I. In the drawing, M1 stands for the first shooting mode, M2 stands for the second shooting mode, W stands for the wide angle end, S stands for the intermediate focal length state, T stands for the telephoto end, OB stands for the object side, and IM stands for the image side.

A multi-layer coating for wavelength restriction may be applied to the surface of the cover glass C. The cover glass C may be adapted to have a low pass filtering function.

In the zoom lenses according to the first to eighth examples, the image height in the intermediate focal length state and that at the telephoto end are equal to each other, and the image height at the wide angle end is lower than those in the intermediate focal length state and at the telephoto end. This is because the zoom lens is designed to form a barrel shaped image at the wide angle end, which is converted electrically into a rectangular image to correct distortion.

As shown in FIGS. 1A to 1C, the zoom lens according to the common example A includes, in order from the object side, a first lens unit G1 having a negative refractive power, a second lens unit G2 having a positive refractive power, a third lens unit G3 having a negative refractive power, and a fourth lens unit G4 having a positive refractive power. An aperture stop S is provided between the first lens unit G1 and the second lens unit G2 (in the neighborhood of the second lens unit).

The first lens unit G1 is composed of a negative meniscus lens L1 having a convex surface directed toward the object side, a negative meniscus lens L2 having a convex surface directed toward the object side, and a positive meniscus lens L3 having a convex surface directed toward the object side.

The second lens unit G2 is composed of a biconvex positive lens L4, a biconcave negative lens L5, and a biconvex positive lens L6. The biconcave negative lens L5 and the biconvex positive lens L6 are cemented together.

The third lens unit G3 is composed of a negative meniscus lens L7 having a convex surface directed toward the object side.

The fourth lens unit G4 is composed of a positive meniscus lens L8 having a convex surface directed toward the image side.

During zooming from the wide angle end to the telephoto end, the first lens unit G1 moves first toward the image side and thereafter toward the object side, the second lens unit G2 moves toward the object side, the aperture stop S moves with the second lens unit G2, the third lens unit G3 moves toward the object side, and the fourth lens unit G4 is fixed (stationary).

There are six aspheric surfaces in total, which include both surfaces of the negative meniscus lens L2, both surfaces of the biconcave negative lens L4, and both surfaces of the negative meniscus lens L7.

Now, movement of lens units during focusing will be described with reference to FIGS. 2A to 2c and FIGS. 3A to 3C. There are two types of focusing, or focusing in the first shooting mode (M1) and focusing in the second shooting mode (M2). In FIGS. 2A to 2C, the lens units that move during focusing are indicated for each of the zoom lenses according to the first to third examples.

As shown in FIGS. 2A to 2C, in the first shooting mode, the number of lens units that move during focusing is one throughout the entire focal length range from the wide angle end to the telephoto end. On the other hand, in the second shooting mode, the number of lens units that move during focusing is two at least in the range from the intermediate focal length state to the telephoto end.

The zoom lens according to the first example has a lens configuration same as the common example A. As shown in FIGS. 2A to 2C, only the third lens unit G3 moves during focusing in the first shooting mode. On the other hand, in the second shooting mode, the first lens unit G1 and the third lens unit G3 move during focusing.

As shown in FIG. 3A, in the first shooting mode, the third lens unit G3 moves during focusing throughout the entire focal length range from the wide angle end to the telephoto end (as shown by the broken line). As the focus state is changed from the state in which the zoom lens is focused on an object at infinity to the state in which the zoom lens is focused on an object at a close distance, the third lens unit G3 moves toward the image side.

In the second shooting mode, the first lens unit G1 and the third lens unit G3 move during focusing throughout the entire focal length range from the wide angle end to the telephoto end (as shown by the chain lines). As the focus state is changed from the state in which the zoom lens is focused on an object at infinity to the state in which the zoom lens is focused on an object at a close distance, the first lens unit G1 moves toward the object side, and the third lens unit G3 moves toward the image side.

In this example, the third lens unit G3 constitutes the first focusing lens unit. The first focusing lens unit is composed of one lens. In focusing in the second shooting mode, the first lens unit G1 moves before the third lens unit G3 starts to move.

The zoom lens according to the second example has a lens configuration same as the common example A. As shown in FIGS. 2A to 2C, only the third lens unit G3 moves during focusing in the first shooting mode. On the other hand, in the second shooting mode, the first lens unit G1 and the fourth lens unit G4 move during focusing.

As shown in FIG. 3B, in the first shooting mode, the third lens unit G3 moves during focusing throughout the entire focal length range from the wide angle end to the telephoto end (as shown by the broken line). As the focus state is changed from the state in which the zoom lens is focused on an object at infinity to the state in which the zoom lens is focused on an object at a close distance, the third lens unit G3 moves toward the image side.

In the second shooting mode, the third lens unit G3 and the fourth lens unit G4 move during focusing throughout the entire focal length range from the wide angle end to the telephoto end (as shown by the chain lines). As the focus state is changed from the state in which the zoom lens is focused on an object at infinity to the state in which the zoom lens is focused on an object at a close distance, the third lens unit G3 moves toward the image side, and the fourth lens unit G4 moves toward the object side.

In this example, the third lens unit G3 constitutes the first focusing lens unit. The first focusing lens unit is composed of one lens. In focusing in the second shooting mode, the fourth lens unit G4 moves before the third lens unit G3 starts to move.

The zoom lens according to the third example has a lens configuration same as the common example A. As shown in FIGS. 2A to 2C, only the third lens unit G3 moves during focusing in the first shooting mode. On the other hand, in the second shooting mode, although the second lens unit G2 and the third lens unit G3 move during focusing, the second lens unit G2 does not move in the focal length range from the wide angle end to the intermediate focal length state, and only the third lens unit G3 moves in the focal length range from the wide angle end to the intermediate focal length state. In this way, in this example, only one lens unit is moved for focusing in the focal length range from the wide angle end to the intermediate focal length state even in the second shooting mode as with in the first shooting mode.

As shown in FIG. 3C, in the first shooting mode, the third lens unit G3 moves during focusing throughout the entire focal length range from the wide angle end to the telephoto end (as shown by the chain double-dashed line and the broken line). As the focus state is changed from the state in which the zoom lens is focused on an object at infinity to the state in which the zoom lens is focused on an object at a close distance, the third lens unit G3 moves toward the image side.

In the second shooting mode, the second lens unit G2 does not move during focusing in the focal length range from the wide angle end to the intermediate focal length state but moves in the focal length range from the intermediate focal length state to the telephoto end (as shown by the chain line). The third lens unit G3 moves during focusing throughout the entire focal length range from the wide angle end to the telephoto end (as shown by the chain double-dashed line and the chain line). As the focus state is changed from the state in which the zoom lens is focused on an object at infinity to the state in which the zoom lens is focused on an object at a close distance, the second lens unit G2 moves toward the image side, and the third lens unit G3 moves toward the image side.

In this example, the third lens unit G3 constitutes the first focusing lens unit. The first focusing lens unit is composed of one lens. In focusing in the second shooting mode, the second lens unit G2 moves before the third lens unit G3 starts to move.

As shown in FIGS. 4A to 4C, the zoom lens according to the common example B includes, in order from the object side, a first lens unit G1 having a negative refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is provided in the third lens unit G3.

The first lens unit G1 is composed of a negative meniscus lens L1 having a convex surface directed toward the object side, a negative meniscus lens L2 having a convex surface directed toward the object side, and a positive meniscus lens L3 having a convex surface directed toward the object side.

The second lens unit G2 is composed of a negative meniscus lens L4 having a convex surface directed toward the image side.

The third lens unit G3 is composed of a biconvex positive lens L5, a negative meniscus lens L6 having a convex surface directed toward the object side, and a biconvex positive lens L7. The negative meniscus lens L6 and the biconvex positive lens L7 are cemented together.

The fourth lens unit G4 is composed of a biconcave negative lens L8 and a positive meniscus lens L9 having a convex surface directed toward the object side.

The fifth lens unit G5 is composed of a positive meniscus lens L10 having a convex surface directed toward the image side.

During zooming from the wide angle end to the telephoto end, the first lens unit G1 fixed (stationary), the second lens unit G2 moves first toward the image side and thereafter toward the object side, the third lens unit G3 moves toward the object side, the aperture stop S moves with the third lens unit G3, the fourth lens unit G4 moves toward the object side, and the fifth lens unit G5 is fixed (stationary).

There are six aspheric surfaces in total, which include both surfaces of the negative meniscus lens L2, both surfaces of the biconvex positive lens L5, and both surfaces of the positive meniscus lens L9.

Figure 5A:
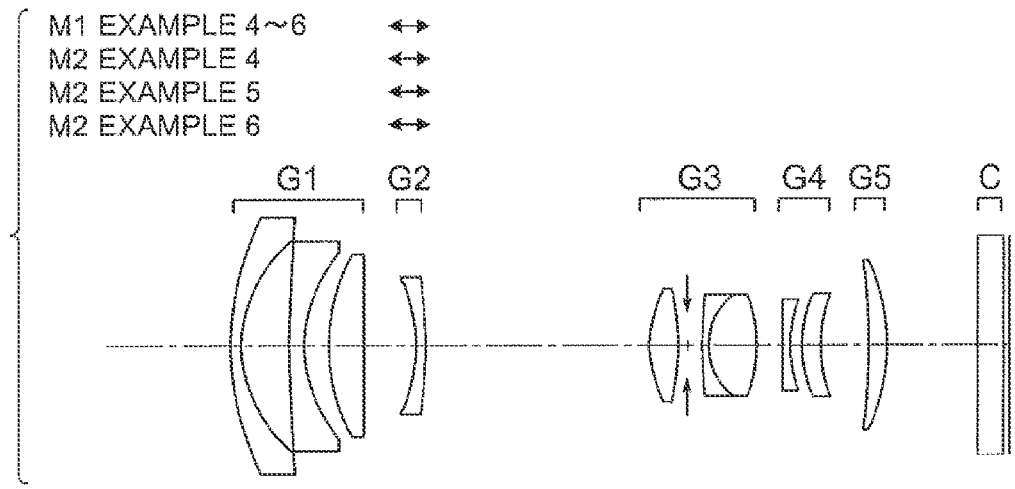
FIGS. 5A, 5B, and 5C are diagrams showing lens units that move during focusing in zoom lenses according to fourth to sixth examples of the present invention at the wide angle end (FIG. 5A), in the intermediate focal length state (FIG. 5B), and at the telephoto end (FIG. 5C)
Figure 5B:
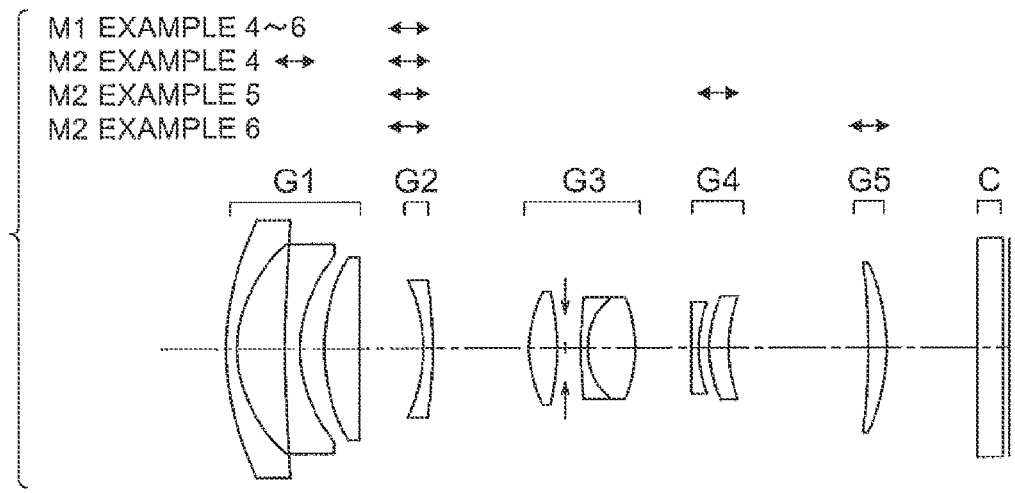
Figure 5C:
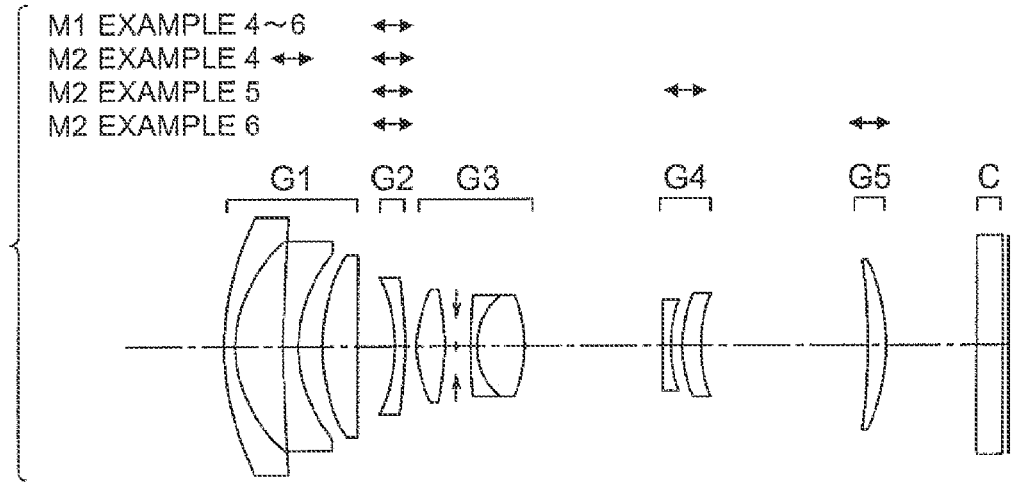

Now, movement of lens units during focusing will be described with reference to FIGS. 5A to 5c and FIGS. 6A to 6C. In FIGS. 5A to 5C, the lens units that move during focusing are indicated for each of the zoom lenses according to the fourth to sixth examples.

As shown in FIGS. 5A to 5C, in the first shooting mode, the number of lens units that move during focusing is one throughout the entire focal length range from the wide angle end to the telephoto end. On the other hand, in the second shooting mode, the number of lens units that move during focusing is two at least in the range from the intermediate focal length state to the telephoto end.

The zoom lens according to the fourth example has a lens configuration same as the common example B. As shown in FIGS. 5A to 5C, only the second lens unit G2 moves during focusing in the first shooting mode. On the other hand, in the second shooting mode, although the first lens unit G1 and the second lens unit G2 move during focusing, the first lens unit G1 does not move in the focal length range from the wide angle end to the intermediate focal length state, and only the second lens unit G2 moves in the focal length range from the wide angle end to the intermediate focal length state. In this way, in this example, only one lens unit is moved for focusing in the focal length range from the wide angle end to the intermediate focal length state even in the second shooting mode as with in the first shooting mode.

As shown in FIG. 6A, in the first shooting mode, the second lens unit G2 moves during focusing throughout the entire focal length range from the wide angle end to the telephoto end (as shown by the chain double-dashed line and the broken line). As the focus state is changed from the state in which the zoom lens is focused on an object at infinity to the state in which the zoom lens is focused on an object at a close distance, the second lens unit G2 moves toward the object side.

In the second shooting mode, the first lens unit G1 does not move during focusing in the focal length range from the wide angle end to the intermediate focal length state but moves in the focal length range from the intermediate focal length state to the telephoto end (as shown by the chain line). The second lens unit G2 moves during focusing throughout the entire focal length range from the wide angle end to the telephoto end (as shown by the chain double-dashed line and the chain line). As the focus state is changed from the state in which the zoom lens is focused on an object at infinity to the state in which the zoom lens is focused on an object at a close distance, the first lens unit G1 moves toward the object side, and the second lens unit G2 moves toward the object side.

In this example, the second lens unit G2 constitutes the first focusing lens unit. The first focusing lens unit is composed of one lens. In focusing in the second shooting mode, the first lens unit G1 moves before the second lens unit G2 starts to move.

The zoom lens according to the fifth example has a lens configuration same as the common example B. As shown in FIGS. 5A to 5C, only the second lens unit G2 moves during focusing in the first shooting mode. On the other hand, in the second shooting mode, although the second lens unit G2 and the fourth lens unit G4 move during focusing, the fourth lens unit G4 does not move in the focal length range from the wide angle end to the intermediate focal length state, and only the second lens unit G2 moves in the focal length range from the wide angle end to the intermediate focal length state. In this way, in this example, only one lens unit is moved for focusing in the focal length range from the wide angle end to the intermediate focal length state even in the second shooting mode as with in the first shooting mode.

As shown in FIG. 6B, in the first shooting mode, the second lens unit G2 moves during focusing throughout the entire focal length range from the wide angle end to the telephoto end (as shown by the chain double-dashed line and the broken line). As the focus state is changed from the state in which the zoom lens is focused on an object at infinity to the state in which the zoom lens is focused on an object at a close distance, the second lens unit G2 moves toward the object side.

In the second shooting mode, the second lens unit G2 moves during focusing throughout the entire focal length range from the wide angle end to the telephoto end (as shown by the chain double-dashed line and the chain line). The fourth lens unit G4 does not move during focusing in the focal length range from the wide angle end to the intermediate focal length state but moves in the focal length range from the intermediate focal length state to the telephoto end (as shown by the chain line). As the focus state is changed from the state in which the zoom lens is focused on an object at infinity to the state in which the zoom lens is focused on an object at a close distance, the second lens unit G2 moves toward the object side, and the fourth lens unit G4 moves toward the image side.

In this example, the second lens unit G2 constitutes the first focusing lens unit. The first focusing lens unit is composed of one lens. In focusing in the second shooting mode, the fourth lens unit G4 moves before the second lens unit G2 starts to move.

The zoom lens according to the sixth example has a lens configuration same as the common example B. As shown in FIGS. 5A to 5C, only the second lens unit G2 moves during focusing in the first shooting mode. On the other hand, in the second shooting mode, although the second lens unit G2 and the fifth lens unit G5 move during focusing, the fifth lens unit G5 does not move in the focal length range from the wide angle end to the intermediate focal length state, and only the second lens unit G2 moves in the focal length range from the wide angle end to the intermediate focal length state. In this way, in this example, only one lens unit is moved for focusing in the focal length range from the wide angle end to the intermediate focal length state even in the second shooting mode as with in the first shooting mode.

As shown in FIG. 6C, in the first shooting mode, the second lens unit G2 moves during focusing throughout the entire focal length range from the wide angle end to the telephoto end (as shown by the chain double-dashed line and the broken line). As the focus state is changed from the state in which the zoom lens is focused on an object at infinity to the state in which the zoom lens is focused on an object at a close distance, the second lens unit G2 moves toward the object side.

In the second shooting mode, the second lens unit G2 moves during focusing throughout the entire focal length range from the wide angle end to the telephoto end (as shown by the chain double-dashed line and the chain line). The fifth lens unit G5 does not move during focusing in the focal length range from the wide angle end to the intermediate focal length state but moves in the focal length range from the intermediate focal length state to the telephoto end (as shown by the chain line). As the focus state is changed from the state in which the zoom lens is focused on an object at infinity to the state in which the zoom lens is focused on an object at a close distance, the second lens unit G2 moves toward the object side, and the fifth lens unit G5 moves toward the object side.

In this example, the second lens unit G2 constitutes the first focusing lens unit. The first focusing lens unit is composed of one lens. In focusing in the second shooting mode, the fifth lens unit G5 moves before the second lens unit G2 starts to move.

As shown in FIGS. 7A to 7C, the zoom lens according to the seventh example includes, in order from the object side, a first lens unit G1 having a negative refractive power, a second lens unit G2 having a positive refractive power, and a third lens unit G3 having a negative refractive power. An aperture stop S is provided between the first lens unit G1 and the second lens unit G2 (in the neighborhood of the second lens unit G2).

The first lens unit G1 is composed of a negative meniscus lens L1 having a convex surface directed toward the object side, a negative meniscus lens L2 having a convex surface directed toward the object side, and a positive meniscus lens L3 having a convex surface directed toward the object side.

The second lens unit G2 is composed of a biconvex positive lens L4, a biconcave negative lens L5, and a biconvex positive lens L6.

The third lens unit G3 is composed of a negative meniscus lens L7 having a convex surface directed toward the object side.

During zooming from the wide angle end to the telephoto end, the first lens unit G1 moves first toward the image side and thereafter toward the object side, the second lens unit G2 moves toward the object side, the aperture stop S moves with the second lens unit G2, and the third lens unit G3 moves toward the object side.

There are four aspheric surfaces in total, which include both surfaces of the negative meniscus lens L2 and both surfaces of the biconvex positive lens L6.

Now, movement of lens units during focusing will be described with reference to FIGS. 8A to 8c and 9. In FIGS. 8A to 8C, the lens units that move during focusing in the zoom lens according to the seventh example are indicated.

As shown in FIGS. 8A to 8C, in the first shooting mode, the number of lens units that move during focusing is one throughout the entire focal length range from the wide angle end to the telephoto end. On the other hand, in the second shooting mode, the number of lens units that move during focusing is two throughout the entire focal length range from the wide angle end to the telephoto end.

As shown in FIGS. 8A to 8C, only the third lens unit G3 moves during focusing in the first shooting mode. On the other hand, in the second shooting mode, the first lens unit G1 and the third lens unit G3 move during focusing.

As shown in FIG. 9, in the first shooting mode, the third lens unit G3 moves during focusing throughout the entire focal length range from the wide angle end to the telephoto end (as shown by the broken line). As the focus state is changed from the state in which the zoom lens is focused on an object at infinity to the state in which the zoom lens is focused on an object at a close distance, the third lens unit G3 moves toward the image side.

In the second shooting mode, the first lens unit G1 and the third lens unit G3 move during focusing throughout the entire focal length range from the wide angle end to the telephoto end (as shown by the chain lines). As the focus state is changed from the state in which the zoom lens is focused on an object at infinity to the state in which the zoom lens is focused on an object at a close distance, the first lens unit G1 moves toward the object side, and the third lens unit G3 moves toward the image side.

In this example, the third lens unit G3 constitutes the first focusing lens unit. The first focusing lens unit is composed of one lens. In focusing in the second shooting mode, the first lens unit G1 moves before the third lens unit G3 starts to move.

As shown in FIGS. 10A to 10C, the zoom lens according to the eighth example includes, in order from the object side, a first lens unit G1 having a negative refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is provided in the third lens unit G3.

The first lens unit G1 is composed of a negative meniscus lens L1 having a convex surface directed toward the object side, a negative meniscus lens L2 having a convex surface directed toward the object side, and a positive meniscus lens L3 having a convex surface directed toward the object side.

The second lens unit G2 is composed of a negative meniscus lens L4 having a convex surface directed toward the image side.

The third lens unit G3 is composed of a biconvex positive lens L5, a negative meniscus lens L6 having a convex surface directed toward the object side, and a biconvex positive lens L7. The negative meniscus lens L6 and the biconvex positive lens L7 are cemented together.

The fourth lens unit G4 is composed of a biconcave negative lens L8 and a positive meniscus lens L9 having a convex surface directed toward the object side.

The fifth lens unit G5 is composed of a positive meniscus lens L10 having a convex surface directed toward the image side.

During zooming from the wide angle end to the telephoto end, the first lens unit G1 is fixed (stationary). The second lens unit G2 moves first toward the image side and thereafter toward the object side, the third lens unit G3 moves toward the object side, the aperture stop S moves with the third lens unit G3, the fourth lens unit G4 moves toward the object side, and the fifth lens unit G5 is fixed (stationary).

There are six aspheric surfaces in total, which include both surfaces of the negative meniscus lens L2, both surfaces of the biconvex positive lens L5, and both surfaces of the positive meniscus lens L9.

Now, movement of lens units during focusing will be described with reference to FIGS. 11A to 11c and 12. In FIGS. 11A to 11C, the lens units that move during focusing in the zoom lens according to the eighth example are indicated.

As shown in FIGS. 11A to 11C, in the first shooting mode, the number of lens units that move during focusing is one throughout the entire focal length range from the wide angle end to the telephoto end. On the other hand, in the second shooting mode, the number of lens units that move during focusing is two throughout the entire focal length range from the wide angle end to the telephoto end.

As shown in FIGS. 11A to 11C, only the fourth lens unit G4 moves during focusing in the first shooting mode. On the other hand, in the second shooting mode, the fourth lens unit G4 and the fifth lens unit G5 move during focusing.

As shown in FIG. 12, in the first shooting mode, the fourth lens unit G4 moves during focusing throughout the entire focal length range from the wide angle end to the telephoto end (as shown by the broken line). As the focus state is changed from the state in which the zoom lens is focused on an object at infinity to the state in which the zoom lens is focused on an object at a close distance, the fourth lens unit G4 moves toward the image side.

In the second shooting mode, the fourth lens unit G4 and the fifth lens unit G5 move during focusing throughout the entire focal length range from the wide angle end to the telephoto end (as shown by the chain lines). As the focus state is changed from the state in which the zoom lens is focused on an object at infinity to the state in which the zoom lens is focused on an object at a close distance, the fourth lens unit G4 moves toward the image side, and the fifth lens unit G5 moves toward the object side.

In this example, the fourth lens unit G4 constitutes the first focusing lens unit. The first focusing lens unit is composed of two lenses. In focusing in the second shooting mode, the fifth lens unit G5 moves before the fourth lens unit G4 starts to move.

As described above, in the zoom lenses according to the first to eighth examples, focusing in the second shooting mode is performed by moving two lens units. This allows improvement of the optical performance of the optical system. The two lens units (that move during focusing) may further be moved. This enables focusing in a closer range while maintaining the optical performance. Such a modification may be made in the second shooting mode.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, wide denotes a wide angle end, standard denotes a intermediate focal length state, tele denotes a telephoto end. Further, focal length denotes a focal length of the entire system, FNO. denotes an F number, IH denotes an image height, fb denotes a back focus, Lens total length is a distance from the frontmost lens surface to the rearmost lens surface plus back focus and each of $f_1, f_2 \ldots$ is a focal length of each lens unit. Further, FB is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

COMMON EXAMPLE A

Examples 1 to 3

Unit mm surface data

| Surface no. | r | d | nd | vd |
|---|---|---|---|---|
| Object plane | ∞ | ∞ | | |
| 1 | 68.660 | 1.80 | 1.78800 | 47.37 |
| 2 | 12.332 | 4.02 | | |
| 3* | 80.000 | 2.01 | 1.52542 | 55.78 |
| 4* | 19.284 | 2.79 | | |
| 5 | 21.150 | 2.88 | 1.84666 | 23.78 |
| 6 | 47.921 | Variable | | |
| 7(stop) | ∞ | 1.00 | | |
| 8* | 14.567 | 3.04 | 1.58209 | 59.46 |
| 9* | −35.255 | 4.34 | | |
| 10 | −98.206 | 1.78 | 1.80100 | 34.97 |
| 11 | 10.111 | 4.23 | 1.48749 | 70.23 |
| 12 | −15.756 | Variable | | |
| 13* | 104.244 | 1.78 | 1.53071 | 55.69 |
| 14* | 22.112 | Variable | | |
| 15 | −46.801 | 1.76 | 1.80518 | 25.42 |
| 16 | −29.294 | 14.01 | | |
| 17 | ∞ | 3.50 | 1.51633 | 64.14 |
| 18 | ∞ | 0.80 | | |
| Image plane (Image pickup surface) | ∞ | | | |

Aspherical surface data

3rd surface k = 55.206
A4 = 3.61587e−05, A6 = −4.90569e−07, A8 = 5.56253e−09,
A10 = −2.97659e−11

4th surface k = −0.639
A4 = 2.53915e−05, A6 = −3.87220e−07, A8 = 2.80346e−09,
A10 = −1.81533e−11

-continued

Unit mm

8th surface k = 0.000
A4 = −2.82063e−05, A6 = −2.06359e−07, A8 = 7.86736e−09,
A10 = −1.77341e−10

9th surface k = 0.000
A4 = 4.86449e−05, A6 = −2.43220e−07, A8 = 7.79158e−09,
A10 = −1.74694e−10

13th surface k = 10.752
A4 = −4.89530e−05, A6 = 1.95403e−06, A8 = −3.39070e−08,
A10 = 5.00099e−10

14th surface k = 3.686
A4 = −7.81833e−05, A6 = 1.74053e−06, A8 = −3.92602e−08,
A10 = 5.00369e−10

Zoom data (at the time of infinity object focus)

| | wide | standard | tele |
|---|---|---|---|
| focal length | 14.27 | 24.90 | 41.17 |
| FNO. | 3.70 | 4.60 | 5.80 |
| IH | 10.07 | 11.15 | 11.15 |
| Fb (in air) | 17.15 | 17.13 | 17.06 |
| Lens total length (in air) | 86.92 | 81.45 | 88.54 |
| d6 | 27.79 | 11.65 | 3.20 |
| d12 | 1.95 | 6.02 | 10.88 |
| d14 | 8.59 | 15.21 | 25.96 |

Unit focal length

| f1 = −21.93 | f2 = 21.30 | f3 = −53.28 | f4 = 93.08 |
|---|---|---|---|

Aperture Diameter (AD) (in Semidiameter) and Object-to-Image Distance (OID) at Close Focus (Common Among Examples 1 to 3)

| | wide | standard | tele |
|---|---|---|---|
| AD | 5.36785 | 5.56235 | 5.97654 |
| OID | 243.2 | 243.2 | 243.2 |

Amount of Movement of Lens Units During Focusing

Example 1

| | 1st Mode | 2nd Mode | |
|---|---|---|---|
| | 3rd Unit G3 | 1st unit G1 | 3rd Unit G3 |
| wide | 1.1 | 0.75 | 0.82 |
| standard | 2.66 | 0.76 | 2.06 |
| tele | 5.67 | 0.86 | 4.49 |

Example 2

|  | 1st Mode 3rd Unit G3 | 2nd Mode 3rd Unit G3 | 4th Unit G4 |
|---|---|---|---|
| wide | 1.1 | 0.79 | 1.07 |
| standard | 2.66 | 2.63 | 1.08 |
| tele | 5.67 | 6.14 | 1.21 |

Example 3

|  | 1st Mode 3rd Unit G3 | 2nd Mode 2nd unit G2 | 3rd Unit G3 |
|---|---|---|---|
| wide | 1.1 | 0 | 1.1 |
| standard | 2.66 | 0.92 | 3.27 |
| tele | 5.67 | 0.85 | 5.16 |

Common Example B

Examples 4 to 6

Unit mm surface data

| Surface no. | r | d | nd | νd |
|---|---|---|---|---|
| Object plane | ∞ | ∞ | | |
| 1 | 39.822 | 1.38 | 1.78800 | 47.37 |
| 2 | 18.113 | 6.27 | | |
| 3* | 124.952 | 1.93 | 1.58253 | 59.32 |
| 4* | 15.295 | 3.40 | | |
| 5 | 26.854 | 4.32 | 1.84666 | 23.78 |
| 6 | 361.404 | Variable | | |
| 7 | −20.594 | 1.17 | 1.74100 | 52.64 |
| 8 | −64.766 | Variable | | |
| 9* | 15.090 | 3.68 | 1.58253 | 59.32 |
| 10* | −28.524 | 1.35 | | |
| 11(stop) | ∞ | 1.86 | | |
| 12 | 83.748 | 1.00 | 1.91082 | 35.25 |
| 13 | 11.894 | 0.01 | 1.56384 | 60.67 |
| 14 | 11.894 | 6.13 | 1.49700 | 81.54 |
| 15 | −18.506 | Variable | | |
| 16 | −129.642 | 1.00 | 1.77250 | 49.60 |
| 17 | 18.256 | 1.57 | | |
| 18* | 25.188 | 2.33 | 1.58313 | 59.38 |
| 19* | 31.337 | Variable | | |
| 20 | −92.656 | 2.48 | 1.75520 | 27.51 |
| 21 | −26.208 | 11.92 | | |
| 22 | ∞ | 3.50 | 1.51633 | 64.14 |
| 23 | ∞ | 0.80 | | |
| Image plane (Image pickup surface) | ∞ | | | |

Aspherical surface data

3rd surface $k = -2.038$
$A4 = 1.51388e{-}05, A6 = -2.36861e{-}07, A8 = 5.43905e{-}10,$
$A10 = 3.17027e{-}12, A12 = -1.09790e{-}14$ 4th surface $k = -1.362$
$A4 = 1.64903e{-}05, A6 = -2.47947e{-}07, A8 = -1.45199e{-}09,$
$A10 = 2.34758e{-}11, A12 = -7.13660e{-}14$ -continued Unit mm 9th surface $k = -0.030$
$A4 = -4.07867e{-}05, A6 = 9.73835e{-}08, A8 = -7.60311e{-}10,$
$A10 = -7.55574e{-}12$ 10th surface $k = 0.105$
$A4 = 6.16363e{-}05, A6 = 1.23753e{-}08, A8 = -6.60232e{-}10,$
$A10 = -5.26748e{-}12$ 18th surface $k = -1.298$
$A4 = 3.42340e{-}04, A6 = -7.03374e{-}06, A8 = 1.43298e{-}07,$
$A10 = -1.25738e{-}09$ 19th surface $k = 2.157$
$A4 = 3.61155e{-}04, A6 = -6.18631e{-}06, A8 = 1.21453e{-}07,$
$A10 = -1.07047e{-}09$ Zoom data (at the time of infinity object focus)

|  | wide | standard | tele |
|---|---|---|---|
| focal length | 12.24 | 24.42 | 49.00 |
| FNO. | 3.70 | 5.30 | 6.50 |
| IH | 10.07 | 11.15 | 11.15 |
| fb(in air) | 15.10 | 15.00 | 15.01 |
| Lens total length (in air) | 100.81 | 100.71 | 100.72 |
| d6 | 6.99 | 8.57 | 5.15 |
| d8 | 29.30 | 12.48 | 1.56 |
| d15 | 3.35 | 7.05 | 17.91 |
| d19 | 6.20 | 17.74 | 21.21 |

Unit focal length $f1 = -45.40 \quad f2 = -41.21 \quad f3 = 18.15 \quad f4 = -22.65 \quad f5 = 47.63$ Aperture Diameter (AD) (in Semidiameter) and Object-to-Image Distance (OID) at Close Focus (Common Among Examples 4 to 6)

|  | wide | standard | tele |
|---|---|---|---|
| AD | 5.11456 | 5.27903 | 6.35081 |
| OID | 350.6 | 350.6 | 350.6 |

Amount of Movement of Lens Units During Focusing

Example 4

|  | 1st Mode 2nd Unit G2 | 2nd Mode 1st unit G1 | 2nd Unit G2 |
|---|---|---|---|
| wide | 1.21 | 0 | 1.21 |
| standard | 1.19 | 1.05 | 1.02 |
| tele | 1.39 | 1.11 | 1.17 |

Example 5

| | 1st Mode 2nd Unit G2 | 2nd Mode 2nd unit G2 | 5th Unit G5 |
|---|---|---|---|
| wide | 1.21 | 1.21 | 0 |
| standard | 1.19 | 0.27 | 0.44 |
| tele | 1.39 | 1.11 | 0.34 |

Example 6

| | 1st Mode 2nd Unit G2 | 2nd Mode 2nd unit G2 | 4th Unit G4 |
|---|---|---|---|
| wide | 1.21 | 1.21 | 0 |
| standard | 1.19 | 1.01 | 0.75 |
| tele | 1.39 | 1.35 | 0.86 |

Example 7

Unit mm surface data

| Surface no. | r | d | nd | vd |
|---|---|---|---|---|
| Object plane | ∞ | ∞ | | |
| 1 | 67.716 | 1.80 | 1.77250 | 49.60 |
| 2 | 12.994 | 3.48 | | |
| 3* | 15.000 | 2.00 | 1.52542 | 55.78 |
| 4* | 9.962 | 5.09 | | |
| 5 | 25.859 | 2.41 | 1.84666 | 23.78 |
| 6 | 58.616 | Variable | | |
| 7(stop) | ∞ | 0.50 | | |
| 8 | 13.134 | 4.42 | 1.51742 | 52.43 |
| 9 | −39.703 | 2.93 | | |
| 10 | −18.897 | 1.00 | 1.80518 | 25.42 |
| 11 | 540.572 | 7.83 | | |
| 12* | 17.196 | 3.47 | 1.49700 | 81.61 |
| 13* | −32.702 | Variable | | |
| 14 | 1181.654 | 1.20 | 1.77250 | 49.60 |
| 15 | 41.991 | Variable | | |
| 16 | ∞ | 3.50 | 1.51633 | 64.14 |
| 17 | ∞ | 0.80 | | |
| Image plane (Image pickup surface) | ∞ | | | |

Aspherical surface data

3rd surface k = 0.000
A4 = −2.11364e−04, A6 = 8.13060e−07, A8 = −2.24802e−09

4th surface k = −0.898
A4 = −2.51039e−04, A6 = 1.13086e−06, A8 = −3.96041e−09

12th surface k = 0.000
A4 = −7.69683e−06, A6 = 4.56052e−07, A8 = −1.10023e−09

13th surface k = 0.000
A4 = 1.09613e−04, A6 = 5.93303e−07, A8 = −6.97149e−10

-continued

Unit mm

Zoom data (at the time of infinity object focus)

| | wide | standard | tele |
|---|---|---|---|
| focal length | 14.28 | 24.24 | 41.16 |
| FNO. | 3.57 | 4.50 | 5.75 |
| IH | 10.07 | 11.15 | 11.15 |
| fb(in air) | 22.39 | 36.59 | 57.98 |
| Lens total length (in air) | 92.36 | 87.71 | 97.38 |
| d6 | 29.13 | 12.16 | 1.49 |
| d13 | 4.70 | 2.82 | 1.77 |
| d15 | 19.29 | 33.49 | 54.87 |

Unit focal length

| f1 = −24.39 | f2 = 23.34 | f3 = −56.39 |
|---|---|---|

Aperture Diameter (AD) (in Semidiameter) and Object-to-Image Distance (OID) at Close Focus

| | wide | standard | tele |
|---|---|---|---|
| AD | 5.48232 | 5.52346 | 5.80915 |
| OID | 240.6 | 240.6 | 240.6 |

Amount of Movement of Lens Units During Focusing

| | 1st Mode 3rd Unit G3 | 2nd Mode 1st unit G1 | 3rd Unit G3 |
|---|---|---|---|
| wide | 1.26 | 1.12 | 0.68 |
| standard | 1.99 | 1.15 | 1.3 |
| tele | 3.06 | 1.13 | 2.33 |

Example 8

Unit mm surface data

| Surface no. | r | d | nd | vd |
|---|---|---|---|---|
| Object plane | ∞ | ∞ | | |
| 1 | 39.822 | 1.38 | 1.78800 | 47.37 |
| 2 | 18.113 | 6.27 | | |
| 3* | 124.952 | 1.93 | 1.58253 | 59.32 |
| 4* | 15.295 | 3.40 | | |
| 5 | 26.854 | 4.32 | 1.84666 | 23.78 |
| 6 | 361.404 | Variable | | |
| 7 | −20.594 | 1.17 | 1.74100 | 52.64 |
| 8 | −64.766 | Variable | | |
| 9* | 15.090 | 3.68 | 1.58253 | 59.32 |
| 10* | −28.524 | 1.35 | | |
| 11(stop) | ∞ | 1.86 | | |
| 12 | 83.748 | 1.00 | 1.91082 | 35.25 |
| 13 | 11.894 | 0.01 | 1.56384 | 60.67 |
| 14 | 11.894 | 6.13 | 1.49700 | 81.54 |
| 15 | −18.506 | Variable | | |
| 16 | −129.642 | 1.00 | 1.77250 | 49.60 |
| 17 | 18.256 | 1.57 | | |
| 18* | 25.188 | 2.33 | 1.58313 | 59.38 |
| 19* | 31.337 | Variable | | |
| 20 | −92.656 | 2.48 | 1.75520 | 27.51 |
| 21 | −26.208 | 11.92 | | |
| 22 | ∞ | 3.50 | 1.51633 | 64.14 |

-continued

Unit mm

| 23 | ∞ | 0.80 |
| Image plane (Image pickup surface) | ∞ | |

Aspherical surface data

3rd surface k = −2.038
A4 = 1.51388e−05, A6 = −2.36861e−07, A8 = 5.43905e−10,
A10 = 3.17027e−12, A12 = −1.09790e−14
4th surface k = −1.362
A4 = 1.64903e−05, A6 = −2.47947e−07, A8 = −1.45199e−09,
A10 = 2.34758e−11, A12 = −7.13660e−14
9th surface k = −0.030
A4 = −4.07867e−05, A6 = 9.73835e−08, A8 = −7.60311e−10,
A10 = −7.55574e−12
10th surface k = 0.105
A4 = 6.16363e−05, A6 = 1.23753e−08, A8 = −6.60232e−10,
A10 = −5.26748e−12
18th surface k = −1.298
A4 = 3.42340e−04, A6 = −7.03374e−06, A8 = 1.43298e−07,
A10 = −1.25738e−09
19th surface k = 2.157
A4 = 3.61155e−04, A6 = −6.18631e−06, A8 = 1.21453e−07,
A10 = −1.07047e−09

Zoom data (at the time of infinity object focus)

| | wide | standard | tele |
|---|---|---|---|
| focal length | 12.24 | 24.42 | 49.00 |
| FNO. | 3.70 | 5.30 | 6.50 |
| IH | 10.07 | 11.15 | 11.15 |
| fb(in air) | 15.10 | 15.00 | 15.01 |
| Lens total length (in air) | 100.81 | 100.71 | 100.72 |
| d6 | 6.99 | 8.57 | 5.15 |
| d8 | 29.30 | 12.48 | 1.56 |
| d15 | 3.35 | 7.05 | 17.91 |
| d19 | 6.20 | 17.74 | 21.21 |

Unit focal length

| f1 = −45.40 | f2 = −41.21 | f3 = 18.15 | f4 = −22.65 | f5 = 47.63 |

Aperture Diameter (AD) (in Semidiameter) and Object-to-Image Distance (OID) at Close Focus

| | wide | standard | tele |
|---|---|---|---|
| AD | 5.11456 | 5.27903 | 6.35081 |
| OID | 350.6 | 350.6 | 350.6 |

Amount of Movement of Lens Units During Focusing

| | 1st Mode 4th Unit G4 | 2nd Mode 4th unit G4 | 5th Unit G5 |
|---|---|---|---|
| wide | 0.25 | 0.04 | 0.57 |
| standard | 0.63 | 0.48 | 0.56 |
| tele | 2.37 | 2.14 | 0.62 |

Aberration diagrams of the common example A and the first to third examples are given as FIGS. 13A, 13B, 13C, 13D, 13E, 13F, 13G, 13H, 13I, 13J, 13K, and 13L (hereinafter, 'FIGS. 13A to 13L'), FIGS. 14A, 14B, 14C, 14D, 14E, 14F, 14G, 14H, 14I, 14J, 14K, and 14L (hereinafter, 'FIGS. 14A to 14L'), FIGS. 15A, 15B, 15C, 15D, 15E, 15F, 15G, 15H, 15I, 15J, 15K, and 15L (hereinafter, 'FIGS. 15A to 15L'), FIGS. 16A, 16B, 16C, 16D, 16E, 16F, 16G, 16H, 16I, 16J, 16K, and 16L (hereinafter, 'FIGS. 16A to 16L'), and FIGS. 17A, 17B, 17C, 17D, 17E, 17F, 17G, 17H, 17I, 17J, 17K, and 17L (hereinafter, 'FIGS. 17A to 17L'). FIGS. 13A to 13L and FIGS. 14A to 14L are aberration diagrams of the common example A, where FIGS. 13A to 13L show aberrations in the state in which the zoom lens is focused on an object at infinity, and FIGS. 14A to 14L show aberrations in the state in which the zoom lens is focused on an object at the close distance in the first shooting mode. FIGS. 15A to 15L, FIGS. 16A to 16L, and FIGS. 17A to 17L show aberrations in the state in which the zoom lens is focused on an object at the close distance in the second shooting mode, where FIGS. 15A to 15L are aberration diagrams of the first example, FIGS. 16A to 16L are aberration diagrams of the second example, and FIGS. 17A to 17L are aberration diagrams of the third example. In the aberration diagrams, "FIY" represents the largest image height.

Among the aberration diagrams, FIGS. 13A, 14A, 15A, 16A, and 17A, FIGS. 13B, 14B, 15B, 16B, and 17B, FIGS. 13C, 14C, 15C, 16C, and 17C, and FIGS. 13D, 14D, 15D, 16D, and 17D respectively show spherical aberration (SA), astigmatism (AS), distortion (DT), and chromatic aberration of magnification (CC) at the wide angle end.

FIGS. 13E, 14E, 15E, 16E, and 17E, FIGS. 13F, 14F, 15F, 16F, and 17F, FIGS. 13G, 14G, 15G, 16G, and 17G, and FIGS. 13H, 14H, 15H, 16H, and 17H respectively show spherical aberration (SA), astigmatism (AS), distortion (DT), and chromatic aberration of magnification (CC) in the intermediate focal length state.

FIGS. 13I, 14I, 15I, 16I, and 17I, FIGS. 13J, FIGS. 13J, 14J, 15J, 16J, and 17J, FIGS. 13K, 14K, 15K, 16K, and 17K, and FIGS. 13L, 14L, 15L, 16L, and 17L respectively show spherical aberration (SA), astigmatism (AS), distortion (DT), and chromatic aberration of magnification (CC) at the telephoto end.

In the following values associate with conditional expressions (1) to (3) are given for each of the examples. Hyphens "-" in the following table mean that the corresponding conditional expressions are not satisfied.

| | Example 1 | Example 2 | Example 3 | Example 4 |
|---|---|---|---|---|
| | wide | | | |
| (1) $M_{F1M2}/M_{F1M1}$ | 0.75 | 0.72 | — | — |
| (2) $SP_{M2}/SP_{M1}$ | 0.92 | — | — | — |
| (3) $CM_{M2}/CM_{M1}$ | 0.86 | 0.27 | — | — |
| | tele | | | |
| (1) $M_{F1M2}/M_{F1M1}$ | 0.79 | — | 0.91 | 0.84 |
| (2) $SP_{M2}/SP_{M1}$ | 0.80 | — | 0.79 | 0.85 |
| (3) $CM_{M2}/CM_{M1}$ | — | 0.90 | — | 0.81 |

| | Example 5 | Example 6 | Example 7 | Example 8 |
|---|---|---|---|---|
| | wide | | | |
| (1) $M_{F1M2}/M_{F1M1}$ | — | — | 0.54 | 0.13 |
| (2) $SP_{M2}/SP_{M1}$ | — | — | 0.96 | — |
| (3) $CM_{M2}/CM_{M1}$ | — | — | — | 0.12 |

-continued

| | tele | | | |
|---|---|---|---|---|
| (1) $M_{F1M2}/M_{F1M1}$ | 0.80 | 0.97 | 0.76 | 0.90 |
| (2) $SP_{M2}/SP_{M1}$ | 0.93 | 0.99 | — | — |
| (3) $CM_{M2}/CM_{M1}$ | 0.91 | 0.51 | 0.68 | 0.38 |

In the following values associate with parameters in the conditional expressions (1) to (3) are given for each of the examples.

| | Example 1 | Example 2 | Example 3 | Example 4 |
|---|---|---|---|---|
| | wide | | | |
| $M_{F1M1}$ | 1.102 | 1.102 | 1.102 | 1.215 |
| $M_{F1M2}$ | 0.821 | 0.789 | 1.102 | 1.215 |
| $SP_{M1}$ | −0.072 | −0.072 | −0.072 | −0.099 |
| $SP_{M2}$ | −0.066 | −0.078 | −0.072 | −0.099 |
| $CM_{M1}$ | −0.098 | −0.098 | −0.098 | −0.080 |
| $CM_{M2}$ | −0.084 | −0.026 | −0.098 | −0.080 |
| | tele | | | |
| $M_{F1M1}$ | 5.673 | 5.673 | 5.673 | 1.397 |
| $M_{F1M2}$ | 4.487 | 6.137 | 5.162 | 1.171 |
| $SP_{M1}$ | −0.139 | −0.139 | −0.139 | −0.075 |
| $SP_{M2}$ | −0.111 | −0.142 | −0.110 | −0.064 |
| $CM_{M1}$ | −0.179 | −0.179 | −0.179 | −0.210 |
| $CM_{M2}$ | −0.179 | −0.161 | −0.196 | −0.171 |

| | Example 5 | Example 6 | Example 7 | Example 8 |
|---|---|---|---|---|
| | wide | | | |
| $M_{F1M1}$ | 1.215 | 1.215 | 1.258 | 0.246 |
| $M_{F1M2}$ | 1.215 | 1.215 | 0.680 | 0.033 |
| $SP_{M1}$ | −0.099 | −0.099 | −0.140 | −0.101 |
| $SP_{M2}$ | −0.099 | −0.099 | −0.134 | −0.108 |
| $CM_{M1}$ | −0.080 | −0.080 | −0.005 | −0.146 |
| $CM_{M2}$ | −0.080 | −0.080 | 0.012 | −0.017 |
| | tele | | | |
| $M_{F1M1}$ | 1.397 | 1.397 | 3.066 | 2.378 |
| $M_{F1M2}$ | 1.118 | 1.354 | 2.329 | 2.145 |
| $SP_{M1}$ | −0.075 | −0.075 | −0.057 | −0.047 |
| $SP_{M2}$ | −0.070 | −0.074 | −0.080 | −0.048 |
| $CM_{M1}$ | −0.210 | −0.210 | −0.204 | −0.163 |
| $CM_{M2}$ | −0.192 | −0.108 | −0.139 | −0.062 |

FIG. 18 is a cross-sectional view of a single-lens mirrorless camera as an electronic image pickup apparatus. In FIG. 18, a taking lens system 2 is disposed inside a lens barrel of a single-lens mirrorless camera 1. A mount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the zoom lens according to the present invention described in any one of the examples from the first example to the eighth example is to be used. A moving mechanism member 6 for moving the focusing lens unit Lf and a moving mechanism member 7 for moving the wobbling lens unit Lw are disposed inside the lens barrel.

FIG. 19 and FIG. 20 are conceptual diagrams of an arrangement of the image pickup apparatus according to the present invention. FIG. 19 is a front perspective view showing an appearance of a digital camera 40 as the image pickup apparatus, and FIG. 20 is a rear perspective view of the digital camera 40. The zoom lens according to the present invention is used in a photographic optical system 41 of the digital camera 40.

The digital camera 40 according to the present embodiment includes the photographic optical system 41 which is positioned in a photographic optical path 42, an operating section 44, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

Moreover, by operating the operating section 44, it is possible to switch between a first shooting mode and a second shooting mode. When the first shooting mode is selected, the image pickup apparatus is configured to perform video shooting. When the second shooting mode is selected, the image pickup apparatus is configured to perform still image shooting.

FIG. 21 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 25, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21. The operating section 12 is the operating section 44 shown in FIG. 19.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 140 according to a computer program stored in this computer program memory.

The CCD 49 is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By adopting the zoom lens according to the present invention as the photographic optical system 41 in the digital camera 40 which has been structured as described above, the digital camera 40 can shoot videos with low sound noises generated with movement of lens units and still images with high image quality thanks to high optical performance.

As described in the foregoing, the zoom lens according to the present invention is useful as a zoom lens that enables video shooting with low sound noises generated with movement of lens units and still image shooting with high image quality thanks to high optical performance. The image pickup apparatus according to the present invention is useful as an image pickup apparatus equipped with such a zoom lens.

What is claimed is:

1. A zoom lens comprising:
    a frontmost lens unit, which is located closest to the object side; and
    a plurality of lens units located closer to the image side than the frontmost lens unit, wherein
    all the distances between adjacent lens units vary during zooming in the state in which the zoom lens is focused on an object at infinity,
    one of the plurality of lens units is a first focusing lens unit,
    during focusing from an object at infinity to an object at a short distance in a first shooting mode, only the first focusing lens unit moves, and
    during focusing from an object at infinity to an object at a short distance in a second shooting mode, two lens units in the zoom lens move.

2. The zoom lens according to claim 1, wherein when the two lens units are moved in a predetermined focal length state to change the focus state from a state in which the zoom lens is focused on an object at infinity to a state in which the zoom lens is focused on an object at a close distance, the direction of change in spherical aberration caused by one of the two units is positive and the direction of change in spherical aberration caused by the other of the two lens units is negative so that the change in spherical aberration caused by the one lens unit is cancelled by the change in spherical aberration caused by the other lens unit.

3. The zoom lens according to claim 1, wherein when two lens units are moved in a predetermined focal length state to change the focus state from a state in which the zoom lens is focused on an object at infinity to a state in which the zoom lens is focused on an object at a close distance, the direction of change in curvature of field in the meridional image plane caused by one of the two lens units is positive and the direction of change in curvature of field in the meridional plane caused by the other of the two lens units is negative so that the change in curvature of field in the meridional image plane caused by the one lens unit is cancelled by the change in curvature of field in the meridional image plane caused by the other lens unit.

4. The zoom lens according to claim 1, wherein the number of lenses in the first focusing lens unit is one or two.

5. The zoom lens according to claim 1, wherein the two lens units are the first focusing lens unit and the frontmost lens unit.

6. The zoom lens according to claim 1, wherein the two lens units are the first focusing lens unit and the frontmost lens unit.

7. The zoom lens according to claim 1, wherein the frontmost lens unit is a lens unit having an negative refractive power.

8. The zoom lens according to claim 1, wherein the total number of the lenses that move during focusing is two or less in the first shooting mode and four or more in the second shooting mode.

9. The zoom lens according to claim 1, wherein only the first focusing lens unit moves during focusing at the wide angle end in the first and second shooting modes, and the two lens units move during focusing at the telephoto end in the second shooting mode.

10. The zoom lens according to claim 1, wherein the two lens units include the first focusing lens unit and another lens unit, and the another lens unit moves during focusing before the first focusing lens unit starts to move.

11. The zoom lens according to claim 1, wherein the zoom lens is a four-unit zoom lens including, in order from the object side to the image side,
    a first lens unit having a negative refractive power,
    a second lens unit having a positive refractive power,
    a third lens unit having a negative refractive power, and
    a fourth lens unit having a positive refractive power,
    the first focusing lens unit is the third lens unit, and
    the two lens units are the third lens unit and one of the first, second, and fourth lens units.

12. The zoom lens according to claim 1, wherein the zoom lens is a five-unit zoom lens including, in order from the object side to the image side,
    a first lens unit having a negative refractive power,
    a second lens unit having a negative refractive power,
    a third lens unit having a positive refractive power,
    a fourth lens unit having a negative refractive power,
    and a fifth lens unit having a positive refractive power,
    the first focusing lens unit is the second lens unit, and
    the two lens units are the second lens unit and one of the first, fourth, and fifth lens units.

13. The zoom lens according to claim 1, wherein the zoom lens is a three-unit zoom lens including, in order from the object side to the image side,
    a first lens unit having a negative refractive power,
    a second lens unit having a positive refractive power,
    and a third lens unit having a negative refractive power,
    the first focusing lens unit is the third lens unit, and the two lens units are the first lens unit and the third lens unit.

14. An image pickup apparatus comprising:
a zoom lens according to claim 1;
an image pickup element that converts an image formed by the zoom lens into an electrical signal; and
an operation part used to switch between a first shooting mode and a second shooting mode, wherein
when the first shooting mode is selected, the image pickup apparatus is configured to perform video shooting, and
when the second shooting mode is selected, the image pickup apparatus is configured to perform still image shooting.

15. The zoom lens according to claim 1, wherein at least one of the following expressions (2) and (3) is satisfied:

$$SP_{M2}/SP_{M1}<1 \qquad (2), \text{ and}$$

$$CM_{M2}/CM_{M1}<1 \qquad (3)$$

where $SP_{M1}$ is the absolute value of the amount of spherical aberration in a predetermined focal length state and in the state in which the zoom lens is focused on an object at a close distance in the first shooting mode, $SP_{M2}$ is the absolute value of the amount of spherical aberration in the predetermined focal length state and in the state in which the zoom lens is focused on an object at the close distance in the second shooting mode, $CM_{M1}$ is the absolute value of the distance from a paraxial image plane to a meridional image plane in the predetermined focal length state and in the state in which the zoom lens is focused on an object at the close distance in the first shooting mode, and $CM_{M2}$ is the absolute value of the distance from a paraxial image plane to a meridional image plane in the predetermined focal length state and in the state in which the zoom lens is focused on an object at the close distance in the second shooting mode, where the amount of spherical aberration refers to the amount of spherical aberration at a ray position of 0.7 times the largest entrance pupil diameter, the distance from the paraxial image plane to the meridional image plane refers to the distance at a position of 0.7 times the largest image height, the distance from the close object at the close distance referred to in the definition of $SP_{M1}$ and $CM_{M1}$ to the image plane and the distance from the object at the close distance referred to in the definition of $SP_{M2}$ and $CM_{M2}$ to the image plane are the same, and the predetermined focal length state is a certain focal length state in the range from the wide angle end to the telephoto end.

16. The zoom lens according to claim 15, wherein conditional expressions (2) and (3) are both satisfied.

17. The zoom lens according to claim 15, wherein at least one of the following conditional expressions (2') and (3') is satisfied:

$$SP_{M2}/SP_{M1}<0.86 \qquad (2'), \text{ and}$$

$$CM_{M2}/CM_{M1}<0.92 \qquad (3').$$

18. The zoom lens according to claim 15, wherein the predetermined focal length state is the telephoto end.

19. The zoom lens according to claim 1, wherein one of the two lens units is the first focusing lens unit.

20. The zoom lens according to claim 19, wherein the following conditional expression (1) is satisfied:

$$0.1<M_{F1M2}/M_{F1M1}<0.999 \qquad (1)$$

where $M_{F1M1}=|M_{F1M1i}-M_{F1M1c}|$, and $M_{F1M2}=|M_{F1M2i}-M_{F1M2c}|$, where $M_{F1M1i}$, $M_{F1M1c}$, $M_{F1M2i}$, and $M_{F1M2c}$ are the distances from the first focusing lens unit to the image plane in a predetermined focal length state respectively specified as follows: $M_{F1M1i}$ is the distance in the state in which the zoom lens is focused on an object at infinity in the first shooting mode; $M_{F1M1c}$ is the distance in the state in which the zoom lens is focused on an object at a close distance in the first shooting mode; $M_{F1M2i}$ is the distance in the state in which the zoom lens is focused on an object at infinity in the second shooting mode; and $M_{F1M2c}$ is the distance in the state in which the zoom lens is focused on an object at the close distance in the second shooting mode, the distance from the object at the close distance referred to in the definition of $M_{F1M1c}$ to the image plane and the distance from the object at the close distance referred to in the definition of $M_{F1M2c}$ to the image plane being the same, and the predetermined focal length state being a certain focal length state in the range from the wide angle end to the telephoto end.

21. The zoom lens according to claim 20, wherein the following conditional expression (1') is satisfied:

$$0.15<M_{F1M2}/M_{F1M1}<0.98 \qquad (1').$$

* * * * *